(12) United States Patent
Amano et al.

(10) Patent No.: US 7,117,237 B2
(45) Date of Patent: Oct. 3, 2006

(54) INFORMATION PROCESSING SYSTEM, ENCRYPTION/DECRYPTION SYSTEM, SYSTEM LSI, AND ELECTRONIC EQUIPMENT

(75) Inventors: Kazuhiko Amano, Suwa (JP); Tsugio Nakamura, Nagareyama (JP); Hiroshi Kasahara, Kashiwa (JP); Tatsuya Shimoda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 793 days.

(21) Appl. No.: 10/375,995

(22) Filed: Feb. 28, 2003

(65) Prior Publication Data

US 2003/0147530 A1    Aug. 7, 2003

Related U.S. Application Data

(62) Division of application No. 09/367,234, filed as application No. PCT/JP98/05586 on Dec. 10, 1998, now Pat. No. 6,557,020.

(30) Foreign Application Priority Data

Dec. 10, 1997    (JP)    .................................. 9-340439
Aug. 28, 1998    (JP)    ................................ 10-259283

(51) Int. Cl.
*G06F 7/38*    (2006.01)
(52) U.S. Cl. ........................................ 708/490; 708/491
(58) Field of Classification Search ................ 708/490
See application file for complete search history.

(56) References Cited

U.S. PATENT DOCUMENTS

| | | |
|---|---|---|
| 4,224,676 A | 9/1980 | Appelt |
| 4,768,160 A | 8/1988 | Yokoyama |
| 4,785,393 A | 11/1988 | Chu et al. |
| 4,891,781 A | 1/1990 | Omura |
| 5,285,078 A | 2/1994 | Mimura et al. |

(Continued)

FOREIGN PATENT DOCUMENTS

EP    0 657 804 A1    6/1995

(Continued)

OTHER PUBLICATIONS

F. Hoornaert et al., "*Fast RSA-hardware: Dream or Reality?*", Lecture Notes in Computer Science, 1988, vol. 330, p. 257-264.

(Continued)

*Primary Examiner*—Tan V. Mai
(74) *Attorney, Agent, or Firm*—Mark P. Watson

(57) ABSTRACT

An information processing system that is configured in such a manner that computational processing is performed on input data in accordance with a processing sequence, for outputting data, comprises: a plurality of arithmetic units (7-1 to 7-x), each computing at an arithmetic precision $2^m$ bits (where m is a natural number) based on the processing sequence; and a plurality of cascade connection terminals for cascading these arithmetic units each other. When the maximum arithmetic precision that is required during computational processing is $2^n$ bits (where n is a natural number and is fixed), x numbers of (where x is a natural number) the arithmetic units are cascaded in a manner such that the inequality $x \geq 2^n/2^m$ is satisfied. When an arithmetic precision of $2^{n1}$ bits (where $n1 \leq n$, and n1 is variable) is necessary during computational processing, x1 numbers of the arithmetic units are cascaded in a manner such that the inequality $x1 \geq 2^{n1}/2^m$ (where x1 is a natural number and is variable) is satisfied. This makes it possible to easily implement an information processing system for performing computations to any desired precision in a hardware manner, and also makes it possible to support a simple hardware-based method of expanding the arithmetic precision.

8 Claims, 23 Drawing Sheets

U.S. PATENT DOCUMENTS

| | | | |
|---|---|---|---|
| 5,289,397 | A | 2/1994 | Clark et al. |
| 5,357,122 | A | 10/1994 | Okubora et al. |
| 5,479,365 | A | 12/1995 | Ogura |
| 5,498,886 | A | 3/1996 | Hsu et al. |
| 5,576,554 | A | 11/1996 | Hsu |
| 5,581,767 | A | 12/1996 | Katsuki et al. |
| 5,694,470 | A * | 12/1997 | Jernbacker ............... 705/55 |
| 5,843,799 | A | 12/1998 | Hsu et al. |
| 5,982,900 | A * | 11/1999 | Ebihara et al. ............ 380/30 |
| 6,014,443 | A * | 1/2000 | Mochizuki et al. ......... 713/193 |
| 6,892,301 | B1 * | 5/2005 | Hansmann et al. ......... 713/172 |
| 2003/0179886 | A1 * | 9/2003 | Yamada ..................... 380/277 |

FOREIGN PATENT DOCUMENTS

| | | |
|---|---|---|
| JP | 63-9951 | 1/1988 |
| JP | 63-282777 | 11/1988 |
| JP | 2-14345 | 1/1990 |
| JP | 5-67769 | 3/1993 |
| JP | 5-67770 | 3/1993 |
| JP | 6-97486 | 4/1994 |
| JP | 6-295958 | 10/1994 |
| JP | 7-13945 | 1/1995 |
| JP | 7-264165 | 10/1995 |
| JP | 9-51087 | 2/1997 |

OTHER PUBLICATIONS

E.F. Brickell, "*A Survey Of Hardware Implementations Of RSA*," Lecture Notes in Computer Science, 1990, vol. 435, p. 368-370.

T.W. Drabik, "*Optoelectronic Integrated Systems Based on Free-Space Interconnects With An Arbitrary Degree Of Space Variance*," Proc. IEEE, 1994, vol. 82, No. 11, p. 1595-1622.

S. Miyaguchi, "*Fast Encryption Algorithm For The RSA Cryptographic System*", Proc. IEEE COMPCON, 1982, vol. $25^{th}$, p. 672-678.

J.W. Goodman, et al., "*Optical Interconnections For VLSI Systems*", Proc. IEEE, 1984, vo.. 72, No. 7, p. 850-866.

Ishii, et al. "*High-Speed Public Key Encryption Processor*", The Proceedings of the Electronic Information Communications Society, D-1, vol. J80-D-1, No. 8, pp. 725-735.

* cited by examiner

FIG. IA
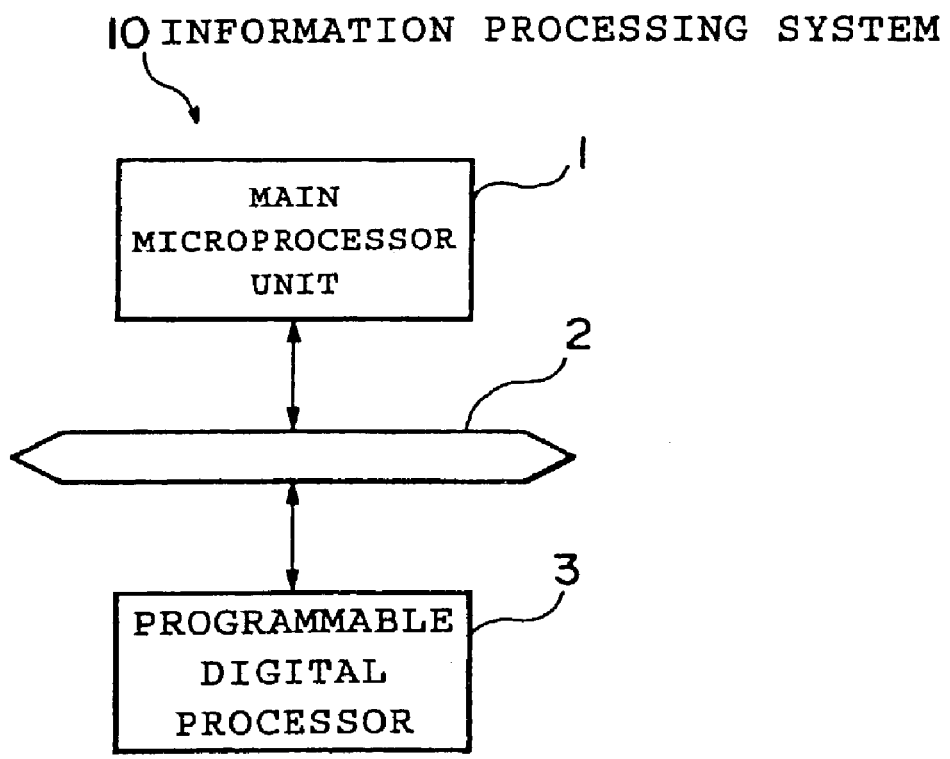
FIG. IB
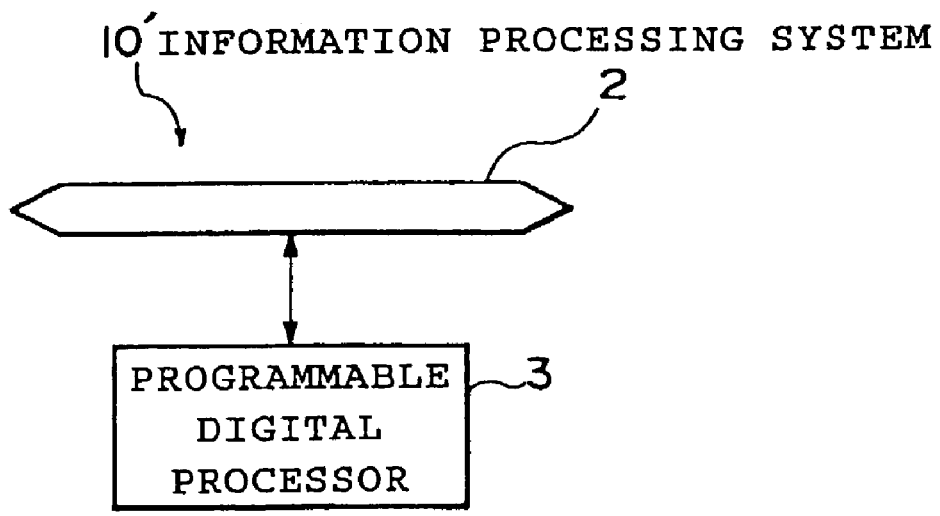

11 PUBLIC-KEY CRYPTOSYSTEM

($A^N \equiv A \mod n$)

| | NUMBER OF GATES PER UNIT (INCORPORATING FOUR MODULES) |
|---|---|
| MULTIPLICATION DEVICE | 1,032×4=4,128 |
| DIVISION DEVICE | 1,700×4=6,800 |
| TOTAL | 10,928 |

$a^b \equiv M \bmod c$

FIG. 14

MAXIMUM COMPUTATION TIME
WHEN ALL OF a, b, AND c HAVE 1024 BITS

TIME REQUIRED FOR MULTIPLICATION (1)

$$1024 \text{ BITS} \times 1023 \text{ REPEATS} = 1,047,552$$

TIME REQUIRED FOR RESIDUE OPERATION (2)

$$2048 \times 1023 = 2,095,104$$

TIME REQUIRED FOR MULTIPLICATION (3)

$$1024 \times 1023 = 1,047,552$$

TIME REQUIRED FOR RESIDUE OPERATION (4)

$$2048 \times 1023 = 2,095,104$$

TOTAL  6,285,312 (CLOCK PULSES)

FOR 66 MHz: $6,285,312 \div (66 \times 10^6) = \underline{92.5 \text{ (ms)}}$

FIG. 15

EXAMPLE OF COMPUTATION TIME FOR $a^b \equiv M \bmod c$

| PRECISION (BITS) | | | NUMBER OF CLOCKS REQUIRED FOR POWER RESIDUE OPERATION | COMPUTATION TIME (ms) | |
|---|---|---|---|---|---|
| a | b | c | | 36MHz | 66MHz |
| 1024 | 1024 | 1024 | 6,285,312 | 174.5 | 95.2 |
| 1024 | 512 | 1024 | 3,139,584 | 87.2 | 47.6 |
| 1024 | 9 | 1024 | 49,152 | 1.4 | 0.7 |

INFORMATION PROCESSING SYSTEM, ENCRYPTION/DECRYPTION SYSTEM, SYSTEM LSI, AND ELECTRONIC EQUIPMENT

CONTINUING APPLICATION DATA

This application is a divisional of U.S. patent application Ser. No. 09/367,234, filed Oct. 13, 1999, now U.S. Pat. No. 6,557,020 which is a 371 of PCT/JP98/05586, filed Dec. 10, 1998, each of which is incorporated herein in its entirety by reference.

TECHNICAL FIELD

The present invention relates to an information processing system and an encryption/decryption system and, in particular, to an information processing system that is capable of performing computation to any desired precision due to the hardware configuration thereof and an encryption/decryption system that is capable of performing encryptions and decryptions due to the hardware configuration thereof. In addition, the present invention also relates to an information processing system, a system LSI, and electronic equipment that use an internal or external bus line for an optical transmission method.

BACKGROUND OF ART

When complicated and large-scale computations are to be performed, such as those for random number generation, wavelet transformation, neural networks, fast Fourier transformation, and digital filters, considerations of development costs and time scales make it standard in the art to implement them by software, using general-purpose computation devices, instead of dedicated hardware which is only used in specific applications.

The recent spread of the Internet has increased the necessity of information security techniques, from the viewpoints of electronic transactions and privacy protection, and cryptographic techniques have drawn attention as effective means of providing them.

The main categories of cryptographic methods are private-key cryptosystem and public-key cryptosystem, where a typical private-key cryptosystem is the Data Encryption Standard (DES) and a typical public-key cryptosystem is Rivest-Shamir-Adleman cryptography (RSA) system.

In principle, DES is a method of rearranging or substituting of a data bit string and RSA is a method of performing residue operations on an extremely large number of bits, so a public-key cryptosystem tends to be several hundred times slower than a private-key cryptosystem. This is because public-key cryptosystems perform residue computations to an extremely high precision, using at least several hundred bits as a modulus.

In such a case, it has become common to use a cryptographic method in which a private-key cryptosystem is used to encrypt a large-volume data string and a public-key cryptosystem is used for delivering authentication, a signature, and a key, which involve a small volume of data.

With public-key cryptosystem, the encryption strength can be selected by varying the bit length of the key, so there is a demand for methods of enabling computations using public keys of various different numbers of bits that have been revealed to communications partners.

If it is desired to exceed the arithmetic precision of a general-purpose computation device, when using a technique of employing such a general-purpose computation device to implement computations by software, such as those used in random number generation, wavelet transformation, neural networks, fast Fourier transformation, and digital filters, it is necessary to support everything in the software and thus it may become impossible to implement this in reality because of increases in programming labor and processing time.

It is regulated that DES must be implemented by using hardware techniques. Therefore, it is in fact difficult to prevent third parties from breaking the ciphers of an encryption/decryption system created by software alone. If part of the encryption algorithm could be implemented by hardware, it will be possible to increase the strength of the encryption.

A single chip public-key cryptographic processor has already been proposed, similar to this public-key cryptosystem (in the proceedings of the Electronic Information Communications Society, D-I, Vol. J80-D-I, No. 8, pp. 725–735, 1997–8).

However, although this single chip public-key cryptographic processor does enable processing at any desired precision within a precision range that is set beforehand by the hardware, processing at a precision in excess of that preset precision is not possible, raising the problem that new hardware must be designed therefor.

If the computation device is configured of thin film transistors (TFTs) on a single chip, by way of example, the presence of non-operating transistors could make the entire computation device unusable, raising problems of a reduction in yield and also an increase in fabrication costs.

As yet another technical concern, recent advances in microcomputers has promoted the miniaturization and value-added capabilities of appliances in various fields, but it has become extremely difficult to design such microcomputers. Together with the push for increases integration of microcomputers formed of microprocessors (MPUs) on single chips, wiring widths are now of the submicron order and the resistance thereof is increasing, and also the stray capacities thereof have been increased by multi-layer configurations, so that distributed parameter circuits are formed in the wiring sections, which increased the propagation delays in electrical signals.

This means that it is necessary to determine the instruction cycle of the central processing unit (CPU) within the microcomputer, after considering the time required for the CPU to transmit data and addresses to other functional units and the time required before the CPU can input data from the other functional units, which increases the design load caused by signal propagation delays.

Recent trends in miniaturization and additional functions have meant that progress has been only in the directions of VLSIs and higher levels of integrations, making the design of microcomputers even more difficult.

Increases in wiring resistance and capacity have not only produced signal propagation delays, they also cause deformation of the rectangular waveforms of signals. There have been recent advances in lower power consumptions, particularly in portable electronic equipment, but if voltage levels become lower and the extent of deformation of the rectangular waveforms increases, it is no longer possible to ensure the functions of signals and erroneous operation can occur.

An objective of the present invention is to provide an information processing system that enables a system that can compute to any desired precision, using a simple hardware structure.

Another objective of the present invention is to provide an encryption/decryption system that makes it possible to facilitate the construction of a system that is required to operate at any desired precision (any desired number of bits), using hardware.

A further objective of the present invention is to provide an information processing system and an encryption/decryption system that make it possible to improve the effective yield when the system is configured on a single chip, and also improve the reliability of the system.

Yet another objective of the present invention is to provide an information processing system and a system LSI, together with electronic equipment using the same, in which signal propagation delays are reduced to a degree such that changes in signal waveform can be ignored, and which can be designed simply.

A still further objective of the present invention is to provide a system LSI, together with electronic equipment using the same, that make it possible to simplify the management of intellectual property rights when using the above encryption/decryption system in a simple manner, even when it incorporates functional blocks developed by other companies.

DISCLOSURE OF INVENTION

One aspect of the present invention relates to an information processing system in which computational processing is performed on input data in accordance with a processing sequence, for outputting data, the information processing system comprising:

a plurality of arithmetic units, each computing to an arithmetic precision of $2^m$ bits (where m is a natural number), based on the processing sequence; and a plurality of cascade connection terminals for cascading the arithmetic units each other, wherein, when the maximum arithmetic precision that is required during computational processing is $2^n$ bits (where n is a natural number and is fixed), x numbers of (where x is a natural number) the arithmetic units are cascaded in a manner such that the inequality $x \geq 2^n/2^m$ is satisfied.

This aspect of the invention simplifies the hardware processing by distributing the computational processing among a plurality of computational processing units, making it possible to configure a system in a simple manner and increase the speed of computational processing, even when high-volume computations and large precisions are required for processing such as that for random number generation, wavelet transformation, fast Fourier transformation, and digital filters. As a result of this distributed processing, it is possible to restrain the number of gates of the arithmetic units, reducing device costs.

In this aspect of the invention, when an arithmetic precision of $2^{n1}$ bits (where $n1 \leq n$, and n1 is variable) is required during computational processing, x1 numbers of the arithmetic units are cascaded in a manner such that the inequality $x1 \geq 2^{n1}/2^m$ (where x1 is a natural number and is variable) is satisfied. In this case, a clock generation circuit generates $2^{n1}$ numbers of reference clock pulses during computational processing. This ensures that x1 out of the x numbers of arithmetic units can be cascaded efficiently. With this configuration, the power that would be consumed by the remaining arithmetic units is saved and computational speeds are also increased. If the configuration is such that optical signals are transmitted between the plurality of arithmetic units, the computational speeds can be further increased.

Each of the plurality of arithmetic units may comprise y numbers of arithmetic modules (where y is a natural number and is fixed), each computing at an arithmetic precision of $2^{m/y}$ when y numbers of the arithmetic modules are cascaded.

When an arithmetic precision of $2^{n1}$ bits (where $n1 \leq n$, and n1 is variable) is required during computational processing, the y numbers of arithmetic modules may be cascaded in a manner such that the inequality $y1 \geq 2^{n1}/2^{m/y}$ (where y1 is a natural number and is variable) is satisfied.

Alternatively, computations may be executed by (x1−1) numbers of cascaded arithmetic units at an arithmetic precision of $2^{n2}$ (where n2<n1) for performing computations at a $2^{n1}$-bit precision; and y1 numbers of arithmetic modules in one other arithmetic unit, which is cascaded from the (x1−1) numbers of arithmetic units, may be cascaded in a manner such that the inequality $y1 \geq (2^{n1}-2^{n2})/2^{m/y}$ (where $y1 \leq y$, and y1 is variable) is satisfied.

If the configuration is such that optical signals are transmitted between the maximum y arithmetic modules, the computational speeds within the arithmetic units can be is further increased.

This aspect of the invention could be further provided with a first storage section for storing a processing sequence. In addition, it could be further provided with computation control means for controlling the plurality of arithmetic units based on the processing sequence stored in the first storage section. In such a case, the optical signals may be transmitted between the plurality of arithmetic units and the computation control means.

This aspect of the invention could further comprise a second storage section for temporarily storing computation results of the plurality of arithmetic units, where optical signals are transmitted between the second storage section and the plurality of arithmetic units.

To give an example of the computations performed by the plurality of arithmetic units, when the input data is X and N and output data is Y, $Y=X^2$ mod N is computed to generate a pseudo-random number.

In this case, when the yield of the plurality of arithmetic units is A and the total number of arithmetic units that are available is K, a maximum number x (where $x \geq K/A$) of the arithmetic units that are operative may be cascaded.

Alternatively, when the yield of the arithmetic modules is A' and the total number of arithmetic modules provided in each of the plurality of arithmetic units is L, a maximum number y (where $y \geq L/A'$) of the arithmetic modules that are operative may be cascaded.

Another aspect of the present invention relates to an information processing system in which computational processing is performed on input data in accordance with a processing sequence, for outputting data, the information processing system comprising:

a plurality of internal arithmetic units, each computing to an arithmetic precision of $2^{m1}$ bits (where m1 is a natural number and is fixed), based on the processing sequence;

a plurality of external arithmetic units for computing to an arithmetic precision of $2^{m2}$ bits (where m2 is a natural number and is fixed); and cascade connection terminals for cascading the plurality of internal arithmetic units and the plurality of external arithmetic units, wherein, when the maximum arithmetic precision required during computational processing is $2^n$ bits (where n is a natural number and is variable), z numbers of the external arithmetic units are cascaded in a manner such that the inequality $z \geq (2^n - 2^{m1})/2^{m2}$ (where z is a natural number and is fixed) is satisfied.

This configuration makes it possible to expand the arithmetic precision in a simple hardware manner, ensuring the reliability of the system while simplifying the design of the information processing system.

An encryption/decryption system in accordance with a further aspect of the present invention comprises:

a plurality of power residue arithmetic units; and a plurality of cascade connection terminals for cascading the plurality of power residue arithmetic units, wherein each of the plurality of power residue arithmetic units comprises:

a multiplication unit for performing a multiplication at a multiplication precision of $2^m$ bits (where m is a natural number and is fixed); and a division unit for performing a division at a division precision of $2^{2 \times m}$ bits, wherein, when the maximum arithmetic precision of a power residue computation executed by the plurality of power residue arithmetic units is $2^n$ (where n is a natural number and is fixed), x numbers of the plurality of power residue arithmetic units are connected together for encryption and decryption, in a manner such that the following inequality is satisfied:

$x \geq 2^n/2^m$ (where x is a natural number and is fixed).

This configuration simplifies the processing of the hardware by distributing the computational processing required for encryption or decryption among a plurality of computational processing units, making it possible to configure a system in a simple manner and increase the speed of computational processing, even when high-volume computations and large precisions are required for the processing. As a result of this distributed processing, it is possible to restrain the number of gates of the arithmetic units, reducing device costs.

An encryption/decryption system in accordance with a still further aspect of the present invention comprises:

a plurality of internal power residue arithmetic units for performing power residue computation at a multiplication precision of $2^{m1}$ bits (where m1 is a natural number and is fixed) and a division precision of $2^{2 \times m1}$ bits;

a plurality of external power residue arithmetic units for performing power residue computation at a multiplication precision of $2^{m2}$ bits (where m2 is a natural number and is fixed) and a division precision of $2^{2 \times m2}$ bits; and cascade connection terminals for cascading the pluralities of internal and external power residue arithmetic units, wherein, when encryption and decryption is performed at a maximum bit precision of $2^n$ (where n is a natural number and is fixed), z numbers of the external power residue arithmetic units are cascaded in a manner such that the following inequality is satisfied:

$z \geq (2^n - 2^{m1})/2^{m2}$ (where z is a natural number and is fixed).

This configuration makes it possible to extend the arithmetic precision for power residue computations in a simple hardware manner, making it possible to ensure sufficient reliability for the precision of the key.

In addition, since external power residue arithmetic units can be configured with a small number of gates, it is possible to simply construct an encryption/decryption system that can run on even a personal computer system.

Yet another aspect of the present invention relates to an information processing system comprising a plurality of functional units, each operating based on multi-channel electrical signals, and a bus line for transmitting signals therebetween, wherein:

each of the plurality of functional units comprises a signal output section and/or a signal input section;

the signal output section comprises electrical-optical signal conversion circuit for converting multi-channel electrical signals into multi-channel optical signals of different wavelengths, and outputting the same;

the signal input section comprises optical-electrical signal conversion circuit for converting the multi-channel optical signals of different wavelengths into the multi-channel electrical signals; and the bus line is formed by an optical transmission medium.

In this case, signal transmission between one functional unit and another functional unit is through a bus line that is an optical transmission medium, using multi-channel optical signals having separated wavelength. For that purpose, a signal output section of each functional unit comprises electrical-optical signal conversion circuit for converting multi-channel electrical signals into multi-channel optical signals, and a signal input section of each functional unit comprises optical-electrical signal conversion circuit for converting multi-channel optical signals into multi-channel electrical signals.

Since transmission between the functional units on the single-chip are optical, signal propagation delays can be virtually ignored because signal propagation is at the speed of light. As a result, there are no design restrictions caused by such signal propagation delays, making the design of the information processing system simpler.

In this aspect of the invention, one of the plurality of functional units may be a central processing unit (CPU), and the bus line may comprise a data bus line and an address bus line. The data and address bus lines are both formed as optical transmission lines.

In this case, one optical transmission medium may be used in common for the data bus line and the address bus line. Data and addresses could be transmitted not simultaneously, but in a time division manner.

In this aspect of the invention, an optical input-output section for providing optical communications with peripheral equipment is preferably connected to the bus line. With such a configuration, an optical signal that has been converted by the electrical-optical signal conversion circuit of one of the functional units within the information processing system can be sent without any further modification to the peripheral equipment and, conversely, an optical signal from the peripheral equipment can be input without any further modification to the information processing system. This also has the advantage that no noise is superimposed on optical signals and there is no need to remove noise from optical signals.

The optical input-output section for providing optical communications with peripheral equipment preferably enables optical communications to and from the peripheral equipment, by a chip select signal transmitted from the central processing unit through -the bus line. In such a case, an optical shutter or the like, which is operated by the chip select signal, could form the optical input-output section.

A yet further aspect of this aspect of the invention relates to a system LSI configured of a first semiconductor device having a first internal bus line and a second semiconductor device having a second internal bus line, connected together by an external bus line, wherein:

the first semiconductor device comprises a first signal output section and a first signal input section, and a central processing unit (CPU) operating based on multi-channel electrical signals is formed on a first substrate, with the first internal bus line;

the second semiconductor device comprises a second signal output section and a second signal input section, and a controlled unit that is controlled by signals from the central processing unit and operates based on multi-channel electrical signals is formed on a second substrate, with the second internal bus line;

each of the first and second signal output sections comprises electrical-optical signal conversion circuit for converting multi-channel electrical signals into multi-channel optical signals having different wavelengths, and outputting the same;

each of the first and second signal input sections comprises optical-electrical signal conversion circuit for converting multi-channel optical signals having different wavelengths into multi-channel electrical signals; and the first and second internal bus lines and the external is bus line are each formed by an optical transmission medium.

In case, for example, the first semiconductor device is the above described single-chip microcomputer, this configuration makes it possible for at least one functional unit that ought to be incorporated into the microcomputer to be incorporated into a second semiconductor device instead. In this case, the functional units within the first and second semiconductor devices can transmit signals to each other by light through the first and second internal bus lines and the external bus line. Therefore, functional units that are on spatially separated substrates are connected by bus lines capable of communicating at the speed of light, so that this configuration is functionally equivalent to a microcomputer incorporating a plurality of functional units sending signals to each other by light within a single chip as described above.

Thus some of the functional units that ought to be incorporated into a single chip can be placed externally thereto, which has the advantage of making it unnecessary to increase the integration. Alternatively, if it is desired to add arithmetic functions, memory or the like to a microcomputer, it is not necessary to re-design the single-chip microcomputer as in the conventional art, so that a basic microcomputer can be attached to a semiconductor device via an external bus line that is an optical transmission medium. This has the advantage of further increasing the universality of the microcomputer.

In particular, application of the present invention makes it possible to freely modify the capacity of cache memory.

More preferably, the configuration is such that an internal clock on an internal bus line can be supplied to the external bus line. This makes it possible for an internal clock to act as a reference clock for all of the functional units, so that data can be processed in synchronized mode.

Incorporating the above described information processing system or system LSI of the present invention is incorporated into electronic equipment makes it possible to support modifications of the functions of the electronic equipment.

A final aspect of in accordance with this aspect of the invention relates to a system LSI incorporating a plurality of functional blocks developed by different manufacturers, wherein:

at least one of the plurality of functional blocks comprises a four-arithmetical-operations function area; and the four-arithmetical-operations function area executes computations for decryption when a predetermined decryption key has been input thereto, and a four-arithmetical-operations function other than the decryption is enabled after the decryption is established.

Assume that this system LSI comprises a functional block that was developed by Company A, by way of example. A decryption key (private key) in accordance with the RSA method is disclosed by license to the end user who is using the functional block developed by Company A within this system LSI. Among the users of this system LSI, only end users who possess the decryption key can use this functional block. To use the functional block developed by Company A in this configuration, it is necessary to acquire the decryption key from Company A by license, simplifying the management of intellectual property rights.

The four-arithmetical-operations function area could also comprise x numbers of arithmetic units, each having an arithmetic precision of $2^m$ bits (where m is a natural number and is fixed), that are cascaded for computations. A portion of the plurality of arithmetic units could comprise a plurality of power residue arithmetic units that are cascaded.

BRIEF DESCRIPTION OF DRAWINGS

FIGS. 1A and 1B are schematic block diagrams of the configuration of an information processing system in accordance with a first embodiment of the present invention;

FIGS. 7A to 7C are diagrams illustrating the difficulties involved with division distributed processing;

FIG. 14 is an illustrative view of the calculation of the computation time necessary for the technique of FIG. 13A;

FIG. 15 illustrates examples of computation times;

BEST MODE FOR CARRYING OUT THE INVENTION

Preferred embodiments of the present invention are described below with reference to the accompanying figures.

First Embodiment

A block diagram of an information processing system in accordance with a first embodiment of the present invention is shown in FIG. 1A.

This information processing system 10 is configured of a number of general-purpose microprocessors, such as two as shown by way of example in FIG. 1A. In FIG. 1A, this information processing system 10 is provided with a main microprocessor unit 1, for controlling the entire system, and a programmable digital processor 3 that is connected to the main microprocessor unit 1 through a bus 2. The programmable digital processor 3 functions as a coprocessor for performing operations at high speed and to a desired arithmetic precision in accordance with a program (processing sequence) that is previously set into the main microprocessor unit 1.

Depending on the specifications required of the information processing system 10, various external devices, that are not shown in the figure, such as a keyboard, mouse, or other input device; a printer or other output device; ROM, RAM, or other storage device; and a hard disk are connected to the bus 2, either directly or via interface devices.

Figure 2:
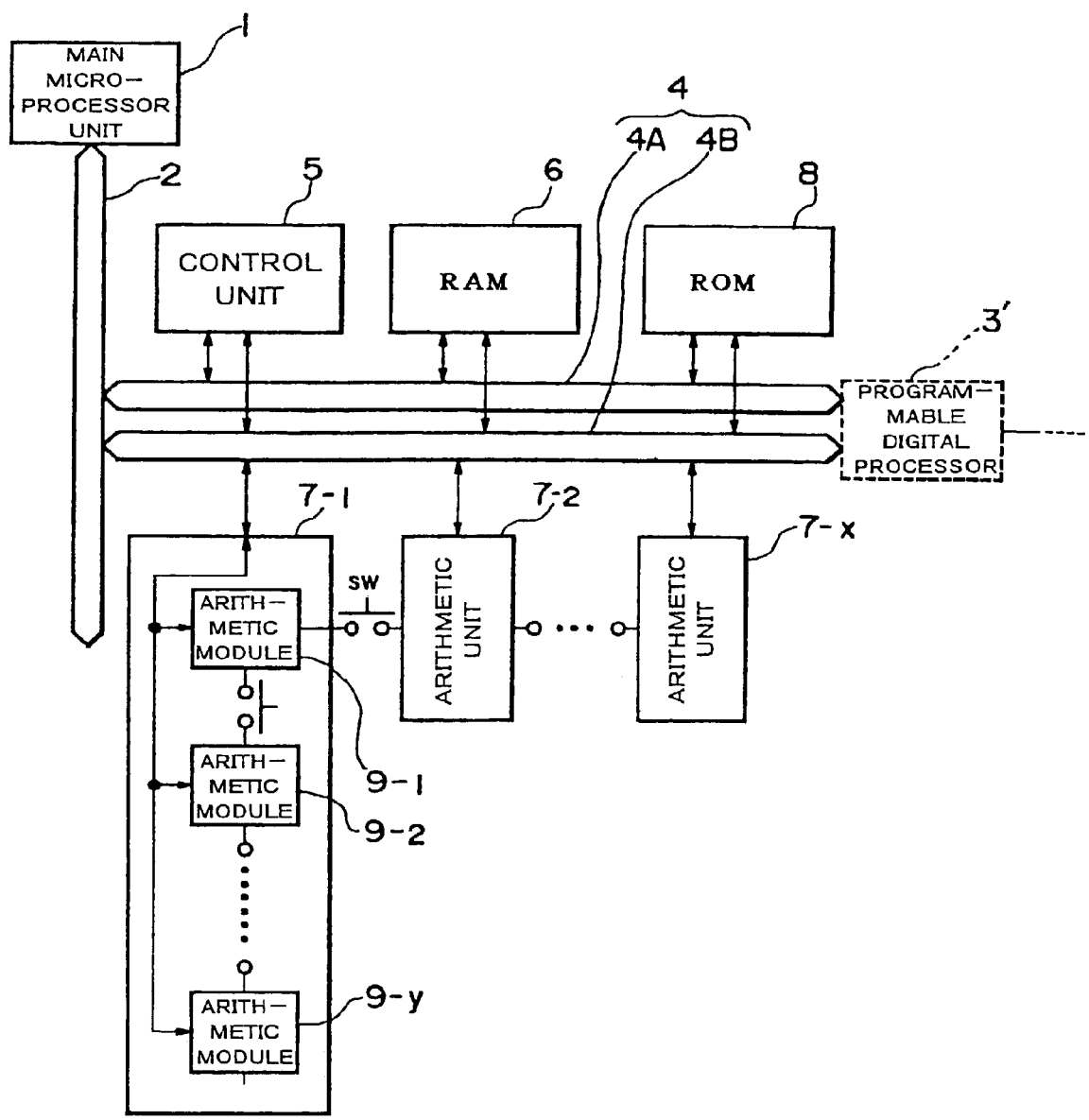
FIG. 2 is a schematic block diagram of the programmable digital processor within FIGS. 1A and 1B.

The configuration of the programmable digital processor 3 of FIG. 1 is shown in FIG. 2. This programmable digital processor 3 has system ROM and system RAM (not shown in the figure), which are programmed by processing sequences loaded in advance from the main microprocessor unit 1, to perform processing such as random number generation, wavelet transformation, fast Fourier transformation, or digital filtering.

The programmable digital processor 3 is provided with a control unit 5 that controls the entire system, RAM 6 and ROM 8 for storing various items of data and the processing sequence during the computations, x numbers of arithmetic units 7-1 to 7-x (where x is a natural number and is fixed) that each operate at an $2^m$-bit arithmetic precision (where m is a natural number and is fixed), switches SW for cascading these arithmetic units 7-1 to 7-x, an internal system bus 4A for transmitting address data and instruction data, and an internal data bus 4B for transmitting various types of data. Note that the internal system bus 4A and the internal data bus 4B are configured of an internal bus 4. Note also that the switches SW are shown in this figure for convenience in comprehending the configuration of the present embodiment in a graphical manner. In practice, the number of arithmetic units that are cascaded efficiently is determined based on a factor such as the number of reference clock pulses generated from the control unit 5 within the programmable digital processor 3, by way of example; the configuration is not such that switches are turned on and off mechanically. This point will be discussed later.

In this case, if the maximum bit precision obtained when all of the arithmetic units are connected together as x cascades is assumed to be $2^n$ (where n is a natural number and is fixed), the maximum number x of cascade connections must satisfy this inequality:

$$x \geq 2^n/2^m$$

Note that, if the required arithmetic precision is a bit. precision of $2^{n1}$ (where n1 is a variable such that $n1 \leq n$) which is less than or equal to the maximum bit precision $2^n$, it is possible to obtain results even when all of the x numbers of arithmetic units 7-1 to 7-x are in an operation-possible state. However, x1 numbers of arithmetic units 7-1 to 7-x1 of the maximum number x of the arithmetic units 7-1 to 7-x could also be cascaded in a way that ensures that they operate efficiently, so long as the following inequality is satisfied:

$$x \geq x1 \geq 2^{n1}/2^m \text{ (where x1 is variable)}$$

It is therefore possible to plan for the most appropriate power consumption, without any unnecessary consumption of power, if operations are to be performed to a $2^{n1}$-bit precision, and thus further optimize the computation time.

In this case, each of the arithmetic units 7-1 to 7-x has y numbers of arithmetic modules 9-1 to 9-y which are capable of performing at an arithmetic precision of $2^{m/y}$ (where y is an integer greater than or equal to 2) and which can be cascaded through switches SW. Note that these switches SW are shown merely for convenience, to make the configuration of the present embodiment readily comprehensible in a visual manner. In practice, the number of arithmetic modules that are cascaded efficiently is determined based on a factor such as the number of reference clock pulses generated from the control unit 5 within the programmable digital processor 3, by way of example; the configuration is not such that switches are turned on and off mechanically If the arithmetic unit 7-1 and the arithmetic unit 7-2 are cascaded efficiently, for example, this is equivalent to cascading a total of 2y numbers of arithmetic modules in this case.

It is also possible with the present embodiment to efficiently cascade $y1 \geq 2^{n1}/2^{m/y}$ (where $y1 \leq y$) numbers of arithmetic modules of all the y numbers of arithmetic modules 9-1 to 9-y within one arithmetic unit, which is sufficient for computing to a $2^{n1}$-bit precision. This makes it possible to further optimize the power consumption and computation time.

Alternatively, it is possible to use (x1−1) numbers of arithmetic units 7-1 to 7-(x−1) and y1 numbers of arithmetic modules within the arithmetic unit 7-x1, and still compute to a $2^{n1}$-bit precision. If the (x1−1) arithmetic units 7-1 to 7-(x−1) are to compute to a $2^{n2}$-bit precision (where n2<n1) with such a configuration, it is sufficient that the following inequality is satisfied: $y1 \geq (2^{n1}-2^{n2})/2^{m/y}$ (where $y1 \leq y$).

The description now turns to the operation of the device shown in FIGS. 1A and 2.

First of all, the main microprocessor unit 1 sends arithmetic instructions, the data necessary for the computations, and arithmetic precision data corresponding to the required arithmetic precision to the programmable digital processor 3 over the bus 2.

Figure 13A:
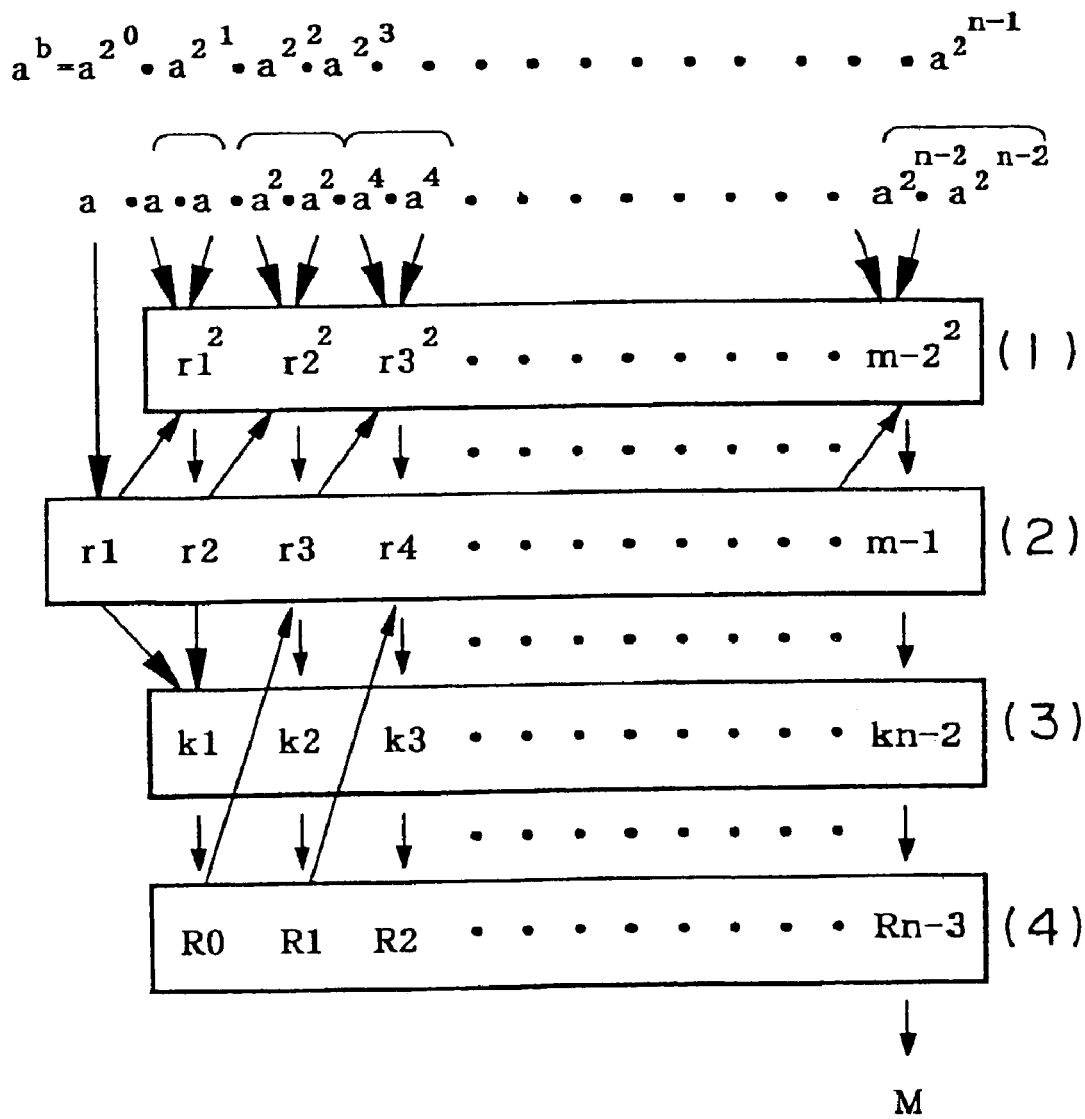
FIG. 13A is an illustrative view of a technique for computing $a^b \equiv M \bmod c$.
Figure 13B:
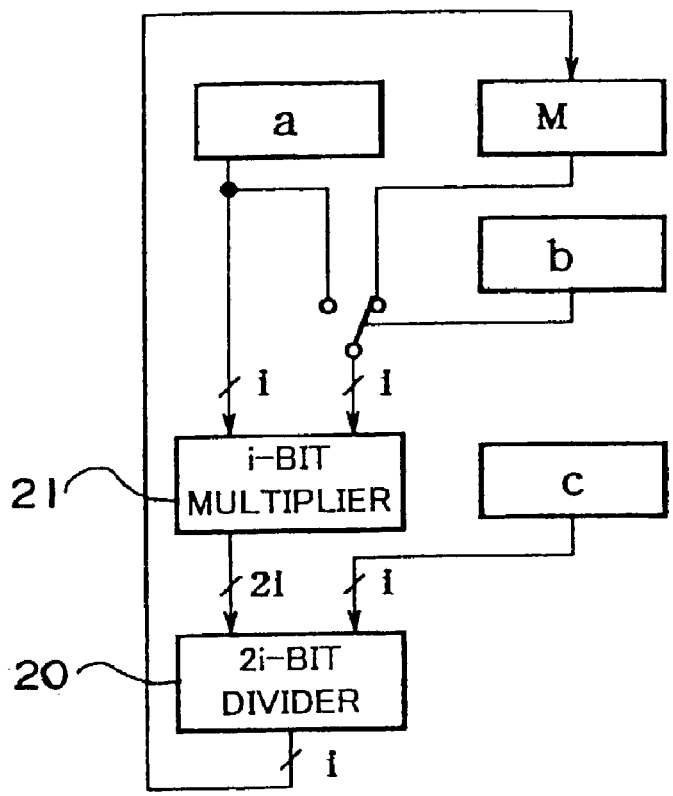
FIG. 13B is a block diagram of a circuit that enables the operation of FIG. 13A.

This ensures that the control unit 5 of the programmable digital processor 3 controls the number of arithmetic units or arithmetic modules corresponding to the required arithmetic precision $2^{n1}$, from among the arithmetic units 7-1 to 7-x, based on a processing sequence from the main microprocessor unit 1 and/or the RAM 6 (such as the encryption sequence shown in FIG. 13B). The arithmetic units 7-1 to 7-x decide the numbers of units and modules that ought to be cascaded, based on the precision information of the arithmetic data. The numbers of units and modules that ought to be cascaded is determined by the number of reference clock pulses necessary for the computations. This reference clock signal is generated by a reference clock signal generation circuit (not shown in the figures) within the information processing system 10.

This ensures that the numbers of arithmetic units and arithmetic modules necessary for the computations are cascaded efficiently, and the control unit 5 can use those arithmetic units for the computations, based on a processing sequence that is programmed in previously.

The thus obtained computation results at a precision of $2^{n1}$ are output to the main microprocessor unit 1 through the bus 2.

In this case, multi-channel electrical signals could be used for the signals over the bus 2 between the chips of the first embodiment, in other words, between the main microprocessor unit 1 and the programmable digital processor 3, or multi-channel optical signals having different wavelengths could be used therefor. Many techniques for providing optical communication between chips have already been proposed.

Furthermore, optical signals can also be used in this first embodiment for transmissions between all or some of the components of the programmable digital processor 3 configured on a single chip. In other words, the internal system bus 4A and internal data bus 4B of the programmable digital processor 3 shown in FIG. 2 could be configured of an optical transmission path. This would make it possible for a control unit 5, the RAM 6, the ROM 8, and the x numbers of arithmetic units 7-1 to 7-x to transmit optical signals through the internal system bus 4A and the internal data bus 4B. In this case, if the configuration is such that information other than electrical signals, for example, magnetized information such as a ferroelectric memory, is stored as a storage element configured of the RAM 6, it is not necessary to convert optical signals into electrical signals. If ferroelectric memory is used, by way of example, information that has been magnetized based on optical signals could be stored. Furthermore, since the x numbers of arithmetic units 7-1 to 7-x are substantially connected by a bus and the y numbers of arithmetic modules making up each of these arithmetic units are also connected by a bus, those buses can be used as optical transmission paths so that optical signals can be transmitted thereby between the arithmetic units and the arithmetic modules.

Note that a specific example of the use of optical transmission paths for internal buses within a single chip will be described later.

The description above concerned with a configuration in which there is a maximum of x numbers of arithmetic units, but it can also be provided with terminals for cascading external arithmetic units onto the programmable digital processor 3, to expand the functions of the system later. Thus, if the configuration is such that external arithmetic units can be cascaded therefrom, it will be possible to ensure an arithmetic precision that is greater than the arithmetic precision obtained by the cascaded internal arithmetic units alone.

More specifically, even if the programmable digital processor 3 is configured as a single chip, one or a plurality of programmable digital processors 3' could be cascaded as shown by the broken lines in FIG. 2 through the internal data bus and cascade connection terminals (not shown in the figure). This is equivalent to cascading the arithmetic units within the programmable digital processor 3' to the arithmetic units within the programmable digital processor 3'. This means that the arithmetic units within one or more programmable digital processors 3' function as external arithmetic units with respect to the internal arithmetic units 7-1 to 7-x within the programmable digital processor 3. It is also possible to transmit signals by optical signals between these internal arithmetic units and external arithmetic units.

If the plurality of external arithmetic units is configured of, for example, thin film transistors (TFTs), there is a danger that there may be inoperative transistors due to factors such as damage, so that a maximum of z external arithmetic units can no longer be used.

If the yield of the arithmetic units is A in such a case, it is preferable to ensure that at least K numbers of (where $z \geq K/A$) arithmetic units are provided in advance. This makes it possible to connect a maximum of z operative arithmetic units together out of the K numbers of arithmetic units.

Since all of the arithmetic modules are the same, not just in the arithmetic units but also in the external arithmetic units, if the yield of external arithmetic modules is A', it is best to ensure that there are at least L (where $y \geq L/A'$) arithmetic modules in each of the external arithmetic units. This makes it possible to connect y numbers of the arithmetic module that are operative among the L numbers of arithmetic modules. Therefore, if an arithmetic module is found to be defective, that arithmetic unit can be handled as an operative unit by switching in one of the redundant arithmetic modules therein.

In addition, to implement computations at a maximum arithmetic precision of $2^n$, when internal arithmetic units within the programmable digital processor 3 that operate at an arithmetic precision of $2^{m1}$ bits (where m1 is a natural number) are cascaded with external arithmetic units within the programmable digital processor 3' that operate at an arithmetic precision of $2^{m2}$ bits (where m2 is a natural number), z1 numbers of the external arithmetic units, out of z numbers of the external arithmetic units could be cascaded in a manner such that the following inequality is satisfied:

$$z \geq (2^n - 2^{m1})/2^{m2}.$$

If computations are to be at a desired bit precision of $2^{n1}$ (where n1 is a natural number, and $n1 \leq n$), only the external arithmetic units that are necessary for the computations can be selected for operation by cascading z numbers of the external arithmetic units in a manner such that the following inequality is satisfied:

$$z \geq z1 \geq (2^{n1} - 2^{m1})/2^{m2} \text{ (where z1 is a natural number).}$$

As a result, it is possible to optimize the power consumption and also optimize the computation time.

Note that the main microprocessor unit 1 of the embodiment shown in FIG. 1A is an indispensable structural requirement for constructing the information processing system 10. However, if the configuration is such that the functions of the main microprocessor unit 1 are provided in the programmable digital processor 3 and a program is loaded from a storage device or an external storage device through the bus 2, the main microprocessor unit 1 could be made unnecessary, as demonstrated by an information processing system 10' shown in FIG. 1B.

The description above concerned a case in which the programmable digital processor 3 loads a program, but it should be obvious that the present invention is not limited thereto. For example, the program for the processing sequence could be stored beforehand in non-volatile memory such as a mask ROM, PROM, or EEPROM, making it possible for the operation to be based on a fixed processing sequence, so that the fixed processing sequence can be implemented by hardware logic.

The description now turns to an example in which the present invention is applied to a pseudo-random number generation device, as a specific example of the first embodiment.

If N is a product of large prime numbers, it is possible to create a computationally secure pseudo-random number using a non-linear operator $Y=X^2$ mod N. In this case "computationally secure" means that breaking the security thereof (in other words, being able to use a partial random number string that is part of the generated random number string to guess another partial random number string that is another part of the generated random number string) is equal in computational complexity to factorizing N.

That is to say, no simple method of calculating factors has been discovered during the long history of mathematics, so it is probably impossible to predict such a random number.

Figure 3:
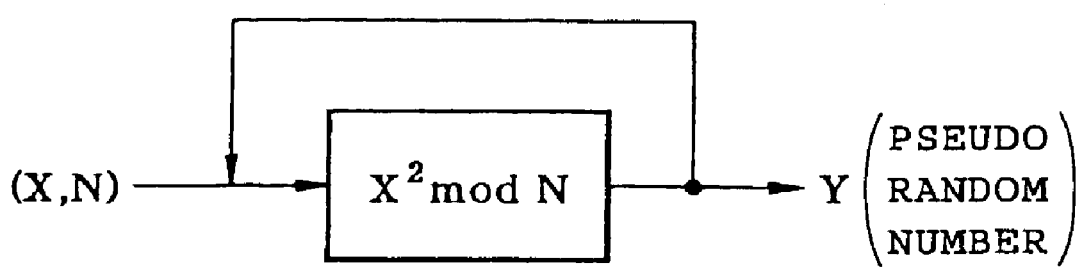
FIG. 3 is a block diagram of a specific example of the pseudo-random number generation circuit of the first embodiment.

A block diagram of the generation of a computationally secure pseudo-random number using $Y=X^2$ mod N is shown in FIG. 3. In this case:

$$N = P \times Q$$

where P and Q are both large prime numbers.

As shown in FIG. 3, a pseudo-random number can be generated to any desired precision during the computational processing of $Y=X^2$ mod N from input data X and N, by using the programmable digital processor 3 of the first embodiment.

As described above, the present embodiment of the invention makes it possible to easily implement an information processing system for performing calculations to any desired precision in a hardware manner, and also makes it possible to support a simple hardware method of expanding the arithmetic precision In the description of this first embodiment of the invention, the control unit 5 and the RAM 6 were provided within the programmable digital processor 3, but it is also possible to configure the information processing system in such a manner that these functions are performed by the main microprocessor unit 1 and the arithmetic units alone are fabricated on a single chip, to enable the system to function as an arbitrary-precision general-purpose processor.

Second Embodiment

The description now turns to a second embodiment in which the present invention is applied to an encryption/decryption system which performed encryption and decryption processing.

1. Principles of RSA Method

Before concentrating on a specific embodiment, the description first concerns the RSA method, which is a typical public-key cryptosystem.

In one usage mode of network encryption, the sender uses an encryption key to encrypt and send message text, and the recipient of the encrypted text uses a decryption key to decrypt the received text and thus reconstitute the message text.

In contrast to a private-key cryptosystem in which the encryption key and the decryption key are the same, these keys are not the same in a public-key cryptosystem where the encryption key is published but the decryption key is kept secret. The principle of the RSA method, which is a typical public-key cryptosystem, will now be discussed.

Assume that the message text is divided into blocks of a suitable size and a numerical value corresponding thereto is M. Assume also that prime numbers p and q are determined, the decryption key (private key) is kept secret, and the public-key (public key) is such that n and e satisfy the following relationships:

$$n = pq \qquad (1)$$

$$gcd(e, (p-1, q-1)) = 1 \qquad (2)$$

In this case, the greatest common divisor (gcd) of e, (p−1), and (q−1) is 1; in other words, a positive number e which is prime to (p−1) and (q−1) respectively is appropriately determined.

The sender uses the public key to perform residue computations on message text M to the power of e, using n as modulus (in other words, to derive the remainder C when $M^e$ is divided by n) as shown in Equation 3, and sends encrypted text C.

$$M^e \equiv C \bmod n \qquad (3)$$

The recipient who has received the encrypted text C first uses the private key to find the reciprocal d of e, using (p−1)(q−1) as modulus, as shown in Equation 4.

$$ed \equiv 1 \bmod (P-1)(q-1) \qquad (4)$$

The recipient then deciphers the encrypted text C into the message text M, using the thus obtained d, from Equation 5.

$$C^d \equiv M \bmod n \qquad (5)$$

Incidentally, if Equations 4 and 5 use the lowest common multiple (lcm) (p−1, q−1) of (p−1) and (q−1), d can be set to be small, which leads to a reduction in the computational complexity as shown in Equations 6 and 7.

$$gcd(e, lcm(p-1, q-1)) = 1 \qquad (6)$$

$$ed \equiv 1 \bmod lcm(p-1, q-1) \qquad (7)$$

In this case, since the public key n is the product of private keys p and q, it is usually selected to be at least 512 bits long, so as to disable easy prime factorization thereof.

The RSA method described above is widely acknowledged to be a method with a high level of encryption strength, because of factors such as the use of the mathematical basic known as prime factorization and multiple-precision residue computations.

2. Example of Residue Computations

To ensure that the power residue computation results of Equations 3 and 5 form encrypted/decrypted text, it is necessary to perform integer computations without using any rounding or floating-point arithmetic. Power residue computations enable this system to divide the exponent into portions that can be used for division, to obtain smaller residue computation products. To simplify the description, extremely small numerical values are used below.

Assume that n=55 and e=7 for the public key and p=5 and q=11 for the private key.

If the message text M is assumed to be 3, the encrypted text C is obtained by using Equation 3 with n and e of the public key, from:

$$3^7 \equiv C \bmod 55$$

giving:

$$C=42$$

The value of d is selected from p and q of the private key, for decryption.

From Equation 4:

$$7d \equiv 1 \bmod (5-1)(11-1)$$

in other words, from:

$$7d \equiv 1 \bmod 40$$

the following is obtained:

$$d=23$$

From:

$$42^{23} \equiv M \bmod 55$$

the following is obtained:

$$M=3$$

When:

$$X \equiv r1 \bmod n,$$

$$Y \equiv r2 \bmod n$$

in the residue computations, the multiplication of Equation 8 is established, using n as modulus.

$$X \cdot Y \equiv r1 \times r2 \bmod n \quad (8)$$

This relational expression ensures that the exponent portion is divided into portions that can be operated upon.

For example, $$42^{23} = 42^{5+5+5+5+3}$$
$$= 42^5 \times 42^5 \times 42^5 \times 42^5 \times 42^3$$

In this case, the two residues $42^5$ and $42^3$ are obtained first, as follows:

$$42^5 \equiv 12 \bmod 55$$

$$42^3 \equiv 3 \bmod 55$$

From Equation 8:

$$42^{23} \equiv 12 \times 12 \times 12 \times 12 \times 3 \equiv r \bmod 55$$
$$\uparrow \quad \uparrow \quad \uparrow \quad \uparrow \quad \uparrow$$
$$r1 \quad r2 \quad r3 \quad r4 \quad r5$$

The residue $r_{1-2}$ is then obtained from r1×r2.

From:

$$r1 \times r2 \equiv 12 \times 12 \equiv r_{1-2} \bmod 55$$

the following is obtained:

$$r_{1-2}=34$$

In a similar manner, from:

$$r_{1-2} \times r3 \equiv 34 \times 12 \equiv r_{1-3} \bmod 55$$

the following is obtained:

$$r_{1-3}=23$$

Furthermore, from:

$$r_{1-3} \times r4 \equiv 23 \times 12 \equiv r_{1-4} \bmod 55$$

the following is obtained:

$$r_{1-4}=1$$

Even further, from:

$$r_{1-4} \times r5 \equiv 1 \times 3 \equiv r \bmod 55$$

the following is obtained:

$$r=3$$

It is sufficient that the maximum precision of the residue multiplications in the above process of repeated residue computations is two times or less the modulus n. It is therefore possible to derive the residue that is the objective, by repeating residue computation substituted into small numerical values.

3. Generic Encryption and Decryption Techniques

Figure 16:
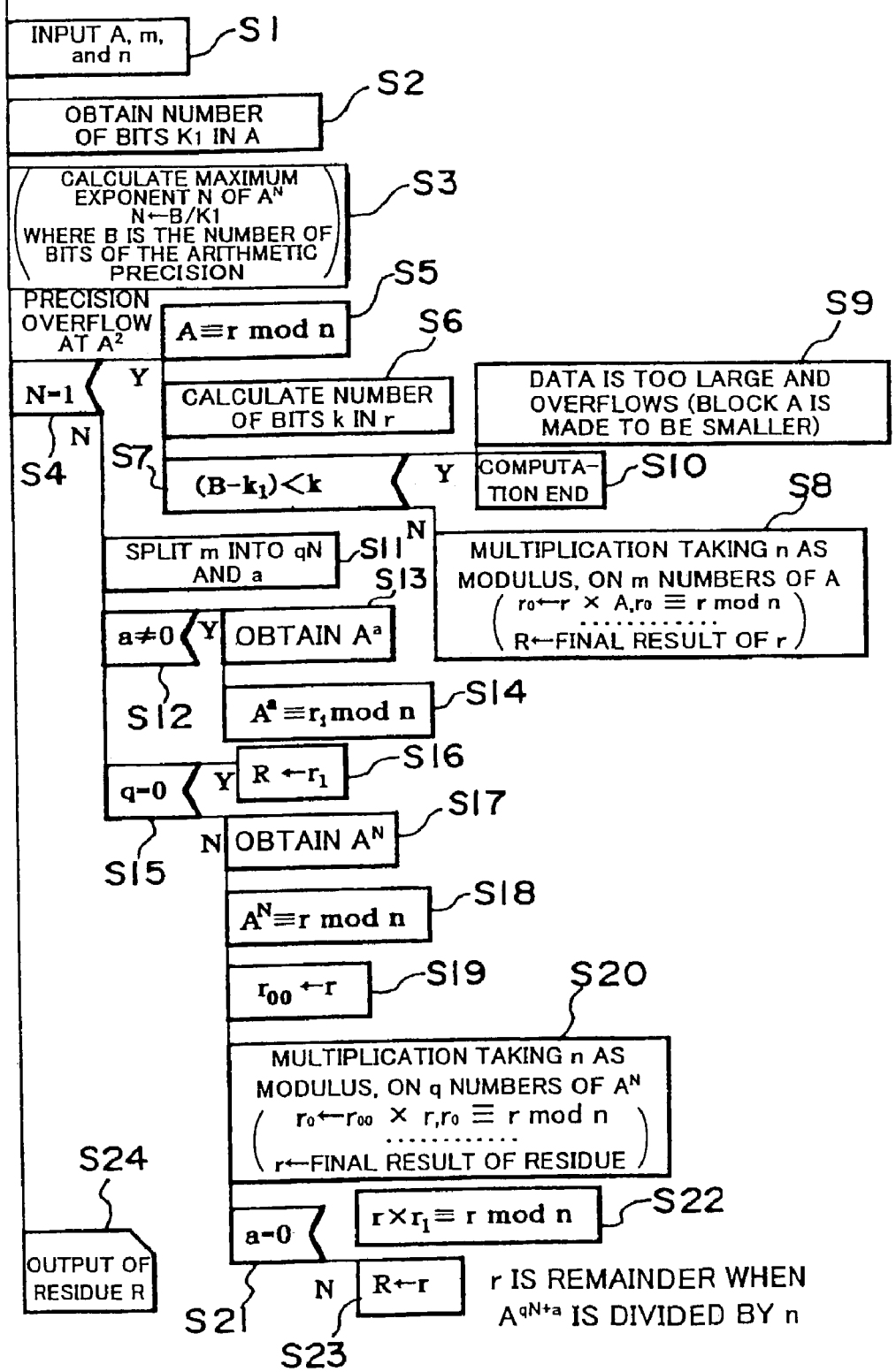
FIG. 16 shows the processing sequence for encryption and decryption in accordance with a prior-art public-key cryptosystem based on the RSA method.

The description now turns to generic techniques used for encryption and decryption in accordance with the RSA method, with reference to FIG. 16.

First of all, the values of A, m, and n are input for the residue computation relating to $A^m \equiv R \bmod n$ (step S1).

For encryption with the congruent expression $A^m \equiv R \bmod n$, the message text M is A, m is the public key e, and the value of R obtained by residue computations using the public key n as modulus is the encrypted text C. For decryption, the encrypted text C is A, the value of d selected from the public key e and the private keys p and q is m, and the value of R obtained by residue computations using as modulus is the message text M.

First of all, the number of bits K1 in A is obtained (step S2), then the maximum exponent N of $A^N$ in the residue computation system is obtained from the number of bits K1 in A (step S3).

The sequence then determines whether or not the maximum exponent N is 1 (step S4) and, if the maximum exponent N is 1, a precision overflow is determined to have occurred at $A^2$ in which case:

$$A \equiv r \bmod n$$

is obtained (step S5), the number of bits k in the residue r is obtained (step S6), and the block size of A is determined from the number of bits k (step S7).

If the block size of A is within the precision range (step S7: No), multiplications taking n as modulus are performed on m numbers of A, and the residue R is derived from these results (step S8).

If the block size of A is outside the precision range of the system (step S7: Yes), it is determined that the data is too large and has caused an overflow (step S9), so the block size of A is made to be smaller and the computational processing ends (step S10).

If, on the other hand, N is greater than or equal to 2 (step S4: No), m is split into qN+a (step S11) and, if a is not zero (step S12: Yes), $A^a$ is obtained (step S13) then the remainder r1 when $A^a$ is divided by n is obtained (step S14).

The sequence then determines whether or not q=0 (step S15) and, if q=0 (step S15: Yes), r1 is determined to be the residue R (step 16).

If it is determined in step S15 that q≠0 (step S15: No), $A^N$ is obtained (step S17) then the residue r when $A^N$ is divided by n is obtained (step S18).

This residue r is substituted into r00 (step S19), multiplications taking n as modulus are performed.on q blocks of $A^N$ (step S20), and, if a≠0 (step S21: No), the residue obtained by dividing the product of the thus obtained multiplication result r and r1 by n is obtained (step S22), the thus obtained residue r is assumed to be the residue R that is to be obtained finally (step S23), and the residue R is output as residue data (step S24).

This encryption and decryption processing (residue computation) of the public-key cryptosystem based on the RSA method is complicated. Particularly with the encryption/decryption system, because of the need for a high level of precision in which n is at least 512 bits long and it is impossible to distribute the divisions as previously mentioned, it is surmised that it will be difficult to implement hardware in accordance with the first embodiment. And the programming of the above described processing as software is not simple and will require a great deal of computation time.

4. Configuration of Public-key Cryptosystem

Figure 4:
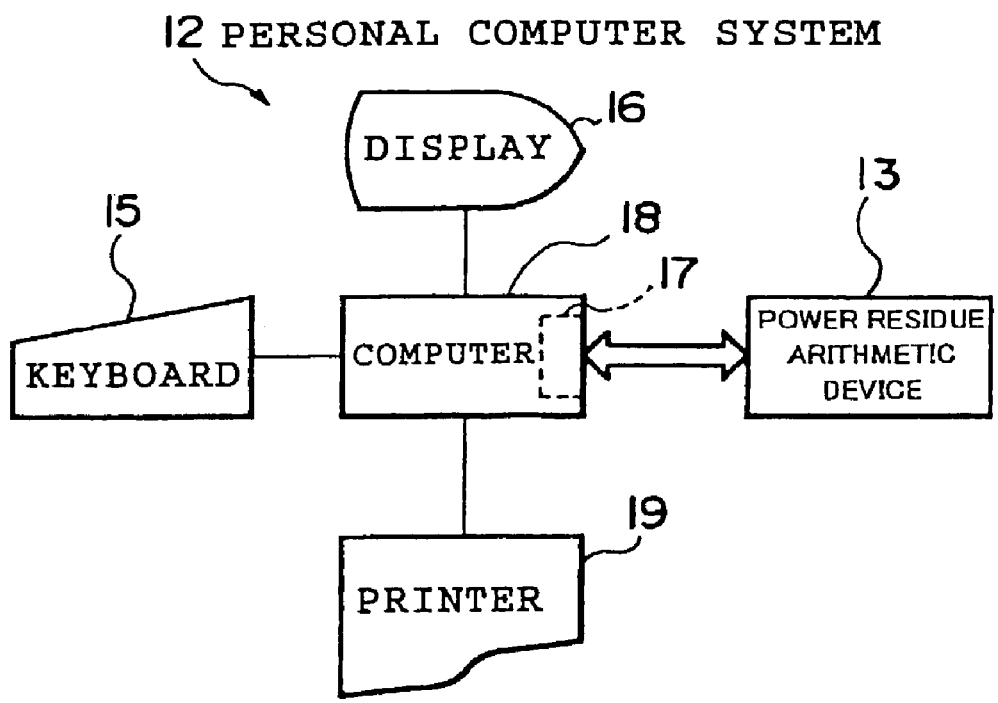
FIG. 4 is a schematic block diagram of an encryption/decryption system in accordance with a second embodiment of the present invention.

A block diagram of a public-key cryptosystem in accordance with the second embodiment of the present invention is shown in FIG. 4.

The main components of a public-key cryptosystem 11 are a personal computer system 12 and a power residue arithmetic device 13 that is connected to the personal computer system 12 by an input-output interface 17.

The personal computer system 12 is provided with a keyboard 15 for inputting various data items, a display 16 for presenting various display items, the input-output interface 17, and a personal computer 18 incorporating an external storage device such as a hard disk (not shown in the figure).

The main components of the power residue arithmetic device 13 are an arbitrary-precision division device 20 that divides at any desired precision within a predetermined precision range and an arbitrary-precision multiplication device 21 that multiplies to any desired precision within a predetermined precision range, connected together by a bus 22.

Figure 6:
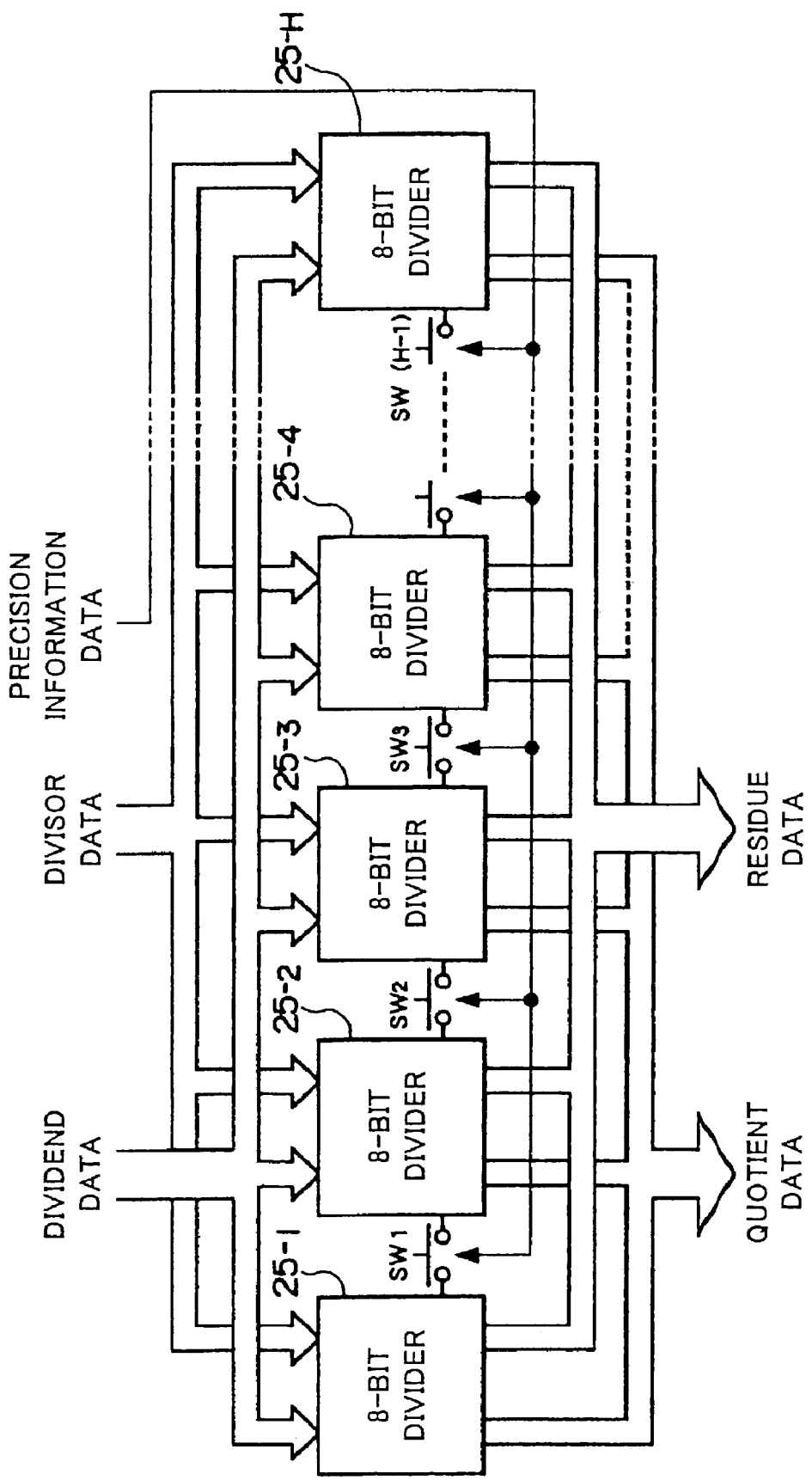
FIG. 6 is a schematic block diagram of the configuration of an arbitrary-precision division device.

5. Configuration of Arbitrary-Precision Division Device and Arbitrary-Precision Multiplication Device The arbitrary-precision division device 20 is provided with H numbers of 8-bit dividers, a first divider 25-1 to an Hth divider 25-H (where H is an integer greater than or equal to 2), to which dividend data and divisor data is input; and (H−1) numbers of switches, a first switch SW1 to an (H−1)th switch SW(H−1), for cascading the 8-bit dividers in accordance with precision information data; as shown in FIG. 6, with the configuration being such that the necessary number of dividers can be cascaded by the first to (H−1)th switches SW1 to SW(H−1) based on the precision information data.

Note that these switches SW1 to SW(H−1) are shown merely for convenience, in a similar manner to FIG. 2. The configuration can also be such that all transmissions of data between the 8-bit dividers and into and out of the bank of 8-bit dividers is done by optical signals.

More specifically, if a division at 8-bit precision is to be performed, all of the switches SW1 to SW(H−1) are placed in an open state and the first divider 25-1 alone operates; if a division to 16-bit precision is to be performed, the first switch SW1 alone is placed in a closed state and the first divider 25-1 and the second divider 25-2 operate; and if a division at (8×J) precision is to be performed (where J is an integer greater than or equal to 2 but less than or equal to (H−1)), the first switch SW1 to the (J−1)th switch SW(J−1) are all placed in a closed state and the first divider 25-1 to the Jth divider 25-J operate.

The dividend and divisor data strings are distributed in sequence between the first divider 25-1 to the Jth divider, in 8-bit units starting from the lowermost 8 bits.

In a similar manner, it is possible to fabricate an arbitrary-precision power residue arithmetic device wherein a plurality of dividers are configured as external power residue arithmetic units having a multiplication precision of $2^m$ bits (where m is a natural number and is fixed) and a division precision of $2^{2m}$ bits; each power residue arithmetic unit is provided with cascade connection terminal for cascading input signal lines for dividend data, divisor data, and precision information data as well as output signal lines for quotient data and residue data; and encryption and decryption can be performed to a maximum $2^n$-bit precision by connecting x numbers of the power residue arithmetic units in a manner such that the following equation is satisfied:

$$x = 2^n/2^m \text{ (where n is a natural number and x is a natural number)}.$$

Note that the configuration of the arbitrary-precision multiplication device 21 is substantially the same as that of the arbitrary-precision division device 20, except that the 8-bit dividers are replaced by 8-bit multipliers, so further description thereof is omitted. In addition, if the bus 22 shown in FIG. 4 is used as an optical transmission path, data transmission between the arbitrary-precision multiplication device 21 and the arbitrary-precision division device 20 can be done by optical signals.

6. Divider Configuration

The description now turns to the configuration of a divider constructed from arbitrary-precision division devices 6.1. Divider Algorithm Before dealing with the divider itself, the description first relates to the algorithm used for division.

Many algorithms have been proposed for division, although not as many as for multiplication. In addition, it is not as if divisions are used as often as multiplications in signal processing.

However, when divisions are necessary in applications such as encryption/decryption used as a concealment technique in signal regularization, computer communications, and information networks, in feature extraction within speech recognition, for computations of linear prediction coefficients using a frequency spectrum as a basis (70 sum-of-products computations and 12 divisions), and in fault-tolerant systems, they do provide an effective means in the art for achieving results rapidly and at a high precision, although their implementation is not as simple as multiplications.

The following four methods are known for implementing such divisions:

(1) A "reciprocal ROM method" whereby a look-up table is listing the relationships between variables x and their reciprocals 1/x is provided in ROM, and a division such as y/x is executed by substituting the multiplication y(1/x).

(2) Instead of executing the division y/x directly, a "logarithm computation method" whereby the values of log x and log y are obtained for x and y from a logarithm ROM, the subtraction z=log x−log y is performed, and finally the value of exp z is obtained from an exponent ROM.

(3) A "subtraction shift method" whereby shifts and subtractions are repeated with respect to the dividend, by trial-and-error.

(4) A "convergent division method" whereby the value of the quotient to be obtained is converged upon as multiplications are repeated.

Of these methods, the reciprocal ROM method is the fastest, but it has a disadvantage in that, if a high precision is required, the capacity of the ROM that is to hold the look-up table increases exponentially. It is therefore used in signal processing only when a comparatively coarse precision is sufficient.

The logarithm computation method also necessitates use only after sufficient investigation of the precision, which is restricted by the capacity of the logarithm ROM, which means that it is difficult to call it a general-purpose method that can be used in any situation.

Of the above four methods, the subtraction shift method and convergent division method enable divisions to any desired precision.

The convergent division method views the dividend and divisor as the numerator and denominator of a fraction, multiplies the numerator and denominator by the same convergence coefficient until the denominator approaches 1, then takes the value of the thus obtained final numerator as the quotient. Alternatively, it can be used to obtain the reciprocal of the divisor by a convergence algorithm, then obtain the quotient by multiplying this reciprocal by the dividend.

However, when an expansion of the division capability by connecting together a plurality of chips (modules) is considered, this convergent division method that performs a convergence by approximations causes problems in that the propagation of partial residue involves further approximations and thus large errors can occur.

The subtraction shift method is the most suitable, in that it does not have any of the above problems, it can divide at any desired precision, and the division capability can be expanded by connecting together a plurality of chips (modules).

The discussion now concerns a function for expanding the division capability.

To perform the following division, for example:

567890/1234 subtractions of the divisor from the dividend are repeated, as shown in FIG. 7A.

If it is considered to use two-digit-divisor dividers (or division modules) where the divisor has been expanded to four is digits in this case, the divisor 1234 would be split into a divisor 12 and a divisor 34 and also the dividend 567890 would be split into a dividend 567 and a dividend 890, as shown in FIGS. 7B and 7C. But it is not possible to obtain an expanded solution of the division (equivalent to FIG. 7A) from the results of the distributed processing using the divisors 12 and 34, unlike with multipliers (this is possible with multiplications).

Therefore, division is effective only within the range of the usable number of digits, and thus it is simply impossible to use this method if the division capability is exceeded by even one bit, no matter how much memory or external circuitry is used.

In addition, rounding is usually employed in division, but this cannot be used in an encryption/decryption system.

For the above reasons, hardware-implemented dividers are handled in the art by software that has slow processing speeds.

However, this divider algorithm is based on the "subtraction shift method" whereby shifts and subtractions are repeated in a trial-and-error manner with respect to the dividend, so the generic basic equation thereof can be expressed by the following recursive equation:

$$R^{(0)}/D = \sum_{j=1}^{n} 2^{-1} q_i + (2^{-n} R^{(n)})/D$$

The quotient Q is $\Sigma\ 2^{-1^n} q_i$ and the final residue R is $2^{-n} R^{(n)}$.

j−1

The digit $q_{j+1}$ of the quotient in each computation step is determined by the following size relationship between 2R and D:

If $2R^{(j)} < D$: $q_{j+1} = 0$

If $2R^{(j)} \geq D$: $q_{j+1} = 1$

In other words, a temporary partial residue $R^{(j+1)}$ (=2R$^{(j)}$−D) is first obtained then, if the partial residue $R^{(j+1)}$ is positive or zero, $q_{j+1}=1$ and a negative partial residue is assumed. If the partial residue $R^{(j+1)}$ is negative, $q_{j+1}=0$ and the subtraction of the temporary partial residue is canceled.

The previous recurrence formula describes that the operations above are obtained by shifting $R^{(n)}$ by n digits to the right.

However, the above recursive equation is applied simply to an n-digit quotient. When division data is dispersed between modules, the dividend and divisor of each module must be in a concatenated state.

In general, the dividend has a larger number of digits than the divisor, so it becomes difficult to simply implement subtractions from the divisor by concatenating a distributed divisor because of concatenation of the divisors and concatenation of the subtracters and latch circuits accordingly.

In contrast thereto, the divider of the present embodiment makes it possible to distribute computations between modules by having distributed divisors and subtracters that are fixed within each module, concatenating the dividend, and performing shifts and subtractions thereon.

In the calculations in this case, the divisor is conversely fixed to a calculation by writing and the dividend is left-shifted for subtractions and other operations.

Figure 8:
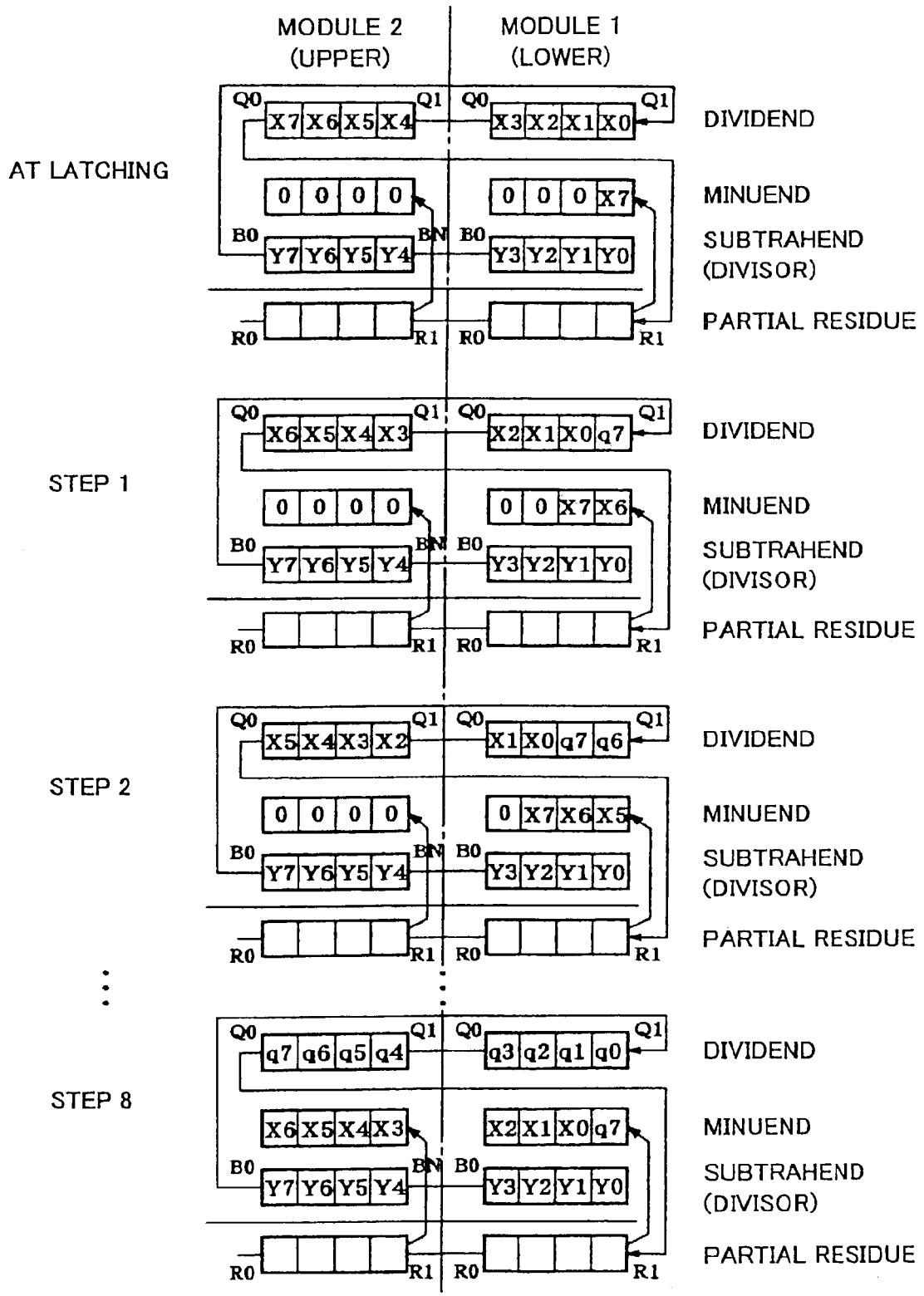
FIG. 8 is an illustrative view of the structure and operation of an arbitrary-precision divider.

To take a simple example, the steps of the operation when a single module is expanded to two modules by 4-bit dividers is shown in FIG. 8.

The divisor distributed between the two modules is concatenated by digit-borrow terminals B0 and BN of the subtracters and latch circuit. The dividend is concatenated by terminals Q1 and Q0 and is returned to an initial-stage R1. With the divisor sections fixed within each module, the dividend is left-shifted by the necessary number of digits and subtractions are repeated therefrom, to end the computations.

The quotient q and the partial residue are determined by the subtraction results obtained in each subtraction step. Note that if 8-bit subtracters are used for this operation, it will be completed at the seventh step and the eighth step merely stores the quotient q0. As a result, quotient data Q is obtained in a dividend latch/shift circuit 32 that will be described later (see FIG. 9) and residue data is obtained in a partial residue shift circuit 34 will be described later (see FIG. 9).

6.2. Schematic Configuration of Divider

Figure 9:
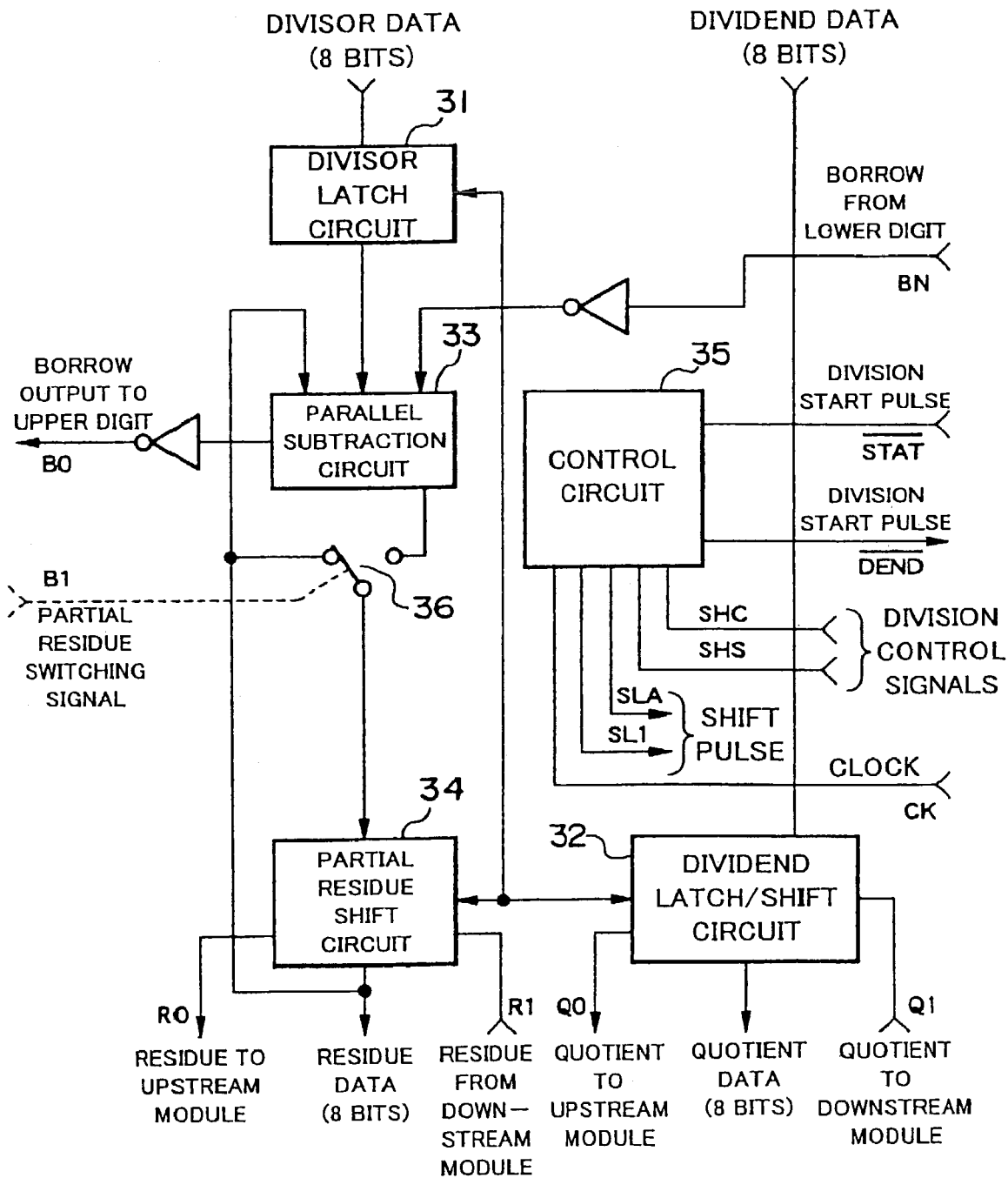
FIG. 9 is a schematic block diagram of the configuration of a divider.

A schematic block diagram of the configuration of a divider is shown in FIG. 9, taking the first divider 25-1 as an example.

The first divider 25-1 is provided with a divisor latch circuit 31 that latches 8-bit divisor data that is input thereto, the dividend latch/shift circuit 32 that latches dividend data and performs a shift operation thereon, a parallel subtraction circuit 33 that subtracts a divisor corresponding to the divisor data from a dividend corresponding to the dividend data, the partial residue shift circuit 34 that stores partial residue data and performs a shift operation thereon, and a control circuit 35 that generates shift pulses necessary for the division.

6.3. Operation of Divider

Figure 10:
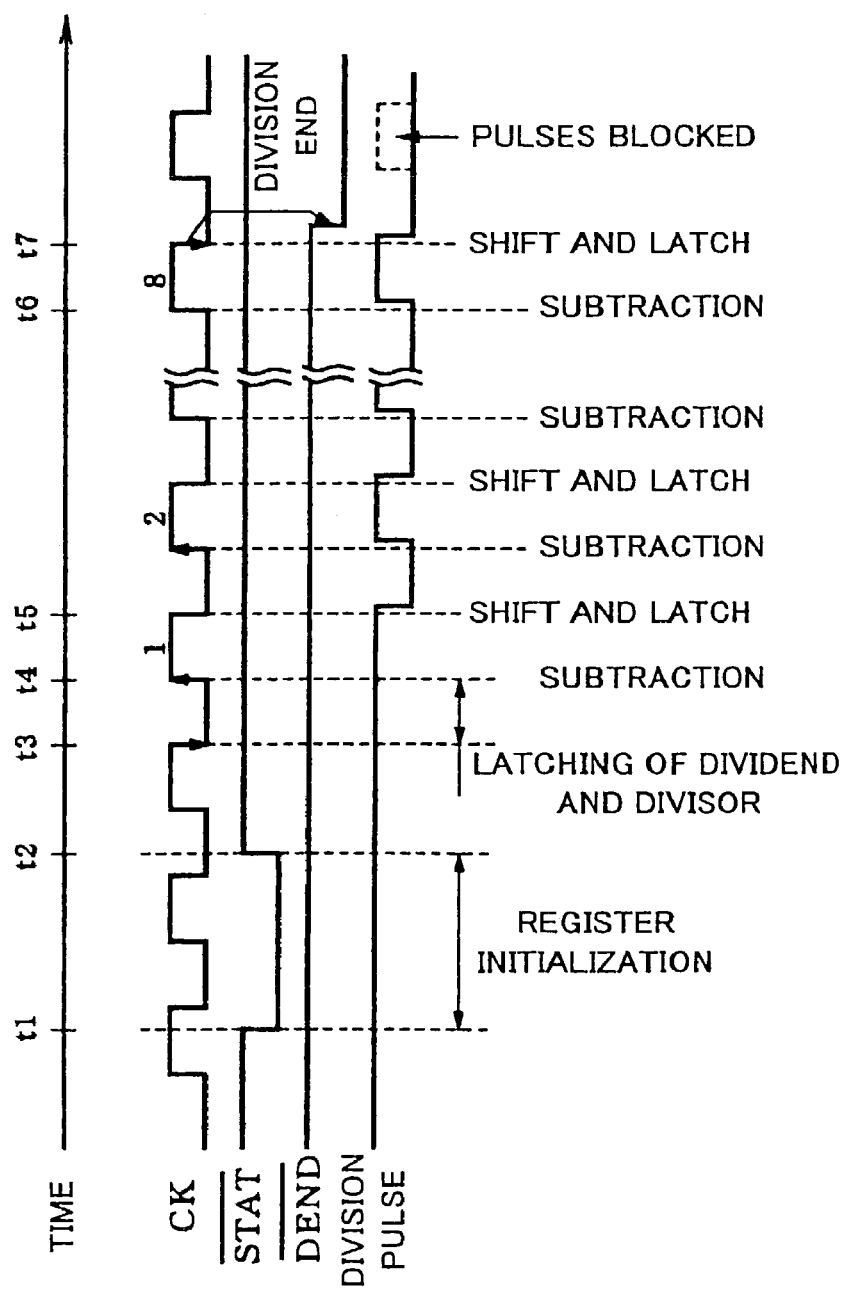
FIG. 10 is a timing chart of the operation of the divider.

The operation of a divider will now be described with reference to FIG. 10.

At a time t1, a division start pulse/STAT (where "/" indicates "low is active" herein) falls and the first divider 25-1 is initialized until the next rise of the division start pulse/STAT (at a time t2).

At the first time t3 that a reference clock signal CK falls after the time t2, dividend data (8 bits) is latched into the dividend latch/shift circuit 32 and divisor data (8 bits) is latched into the divisor latch circuit 31.

At a time t4 at which the reference clock signal CK next rises, a subtraction is performed between the dividend and the divisor in the parallel subtraction circuit 33. If the subtraction result is positive or zero, a switch 36 is turned towards the parallel subtraction circuit 33 side; if the subtraction result of the parallel subtraction circuit 33 is negative, the switch 36 is turned towards the partial residue is shift circuit 34 side.

As a result, at a time t5, the partial residue data in the partial residue shift circuit 34 is shifted and, at the same time, either the partial residue data that is the subtraction result of the parallel subtraction circuit 33 or the partial residue data that is the pre-subtraction data stored in the partial residue shift circuit 34 is latched into the partial residue shift circuit 34.

In a similar manner, the subtraction of the divisor from the dividend and the shift-and-latch operations of the partial residue shift circuit are repeated between the time t5 and a time t6 for the number of times necessary for that dividend, in other words, seven times corresponding to the remaining seven bits if the complete dividend is eight bits long.

When the reference clock signal CK falls at the time t7, the division end signal/DEND goes low and the operation of the upper-digit subtracter (in this case, the second subtracter 25-2) starts in a similar manner.

Similar divisions are performed in the upper-digit subtracters 25-3 to 25-J, and the subtractions end when the division end signal/DEND of the final subtracter 25-J is input to the first subtracter 25-1.

As a result, the quotient data (8-bit) is obtained in the dividend latch/shift circuits 32 of the subtracters 25-1 to 25-J and the residue data is obtained in each of the partial residue shift circuits 34.

Since all of the above operations are performed in synchronization with shift pulses SLA output from the control is circuit 35, there are no timing-related errors due to propagation delays, even when the division capability is expanded by cascading a large number of subtracters.

7. Encryption and Decryption Processing (Residue Computation)

The encryption and decryption processing (residue computation) of the public-key cryptosystem based on the RSA method will now be described, with reference to FIG. 11.

The values of A, N, and n are input to this encryption/decryption system (step S31) for the computation of:

$$A^N \equiv A \bmod n$$

Next, A is substituted into A1 (step S32) and the initial value of a computational variable k is set to 1 (step S33).

The computations of the subsequent steps S34 to S38 are repeated while the computational variable k remains below N, in other words, while the following inequality is satisfied (step S39):

$$k < N.$$

The sequence first determines whether or not N=1 (step S34).

If it is determined in step S34 that N=1, A1 is substituted into A0 (step S35).

If N≠1, A1 and A are multiplied, the multiplication result is substituted into A0 (step S36), A0≡A mod n is obtained (step S37), and the computational variable k becomes k+1 (step S38).

When the computational variable k becomes greater than N, the thus obtained residue A becomes the target residue. During this time, the maximum precision of the multiplications is twice the number of bits in A.

Thus use of the power residue arithmetic device of this first embodiment makes it possible to greatly simplify the processing, in comparison with the prior-art processing of FIG. 16.

8. Number of Gates of Power Residue Arithmetic Device

The description now turns to the number of gates necessary for configuring the power residue arithmetic device in this case.

Figures 11, 12:
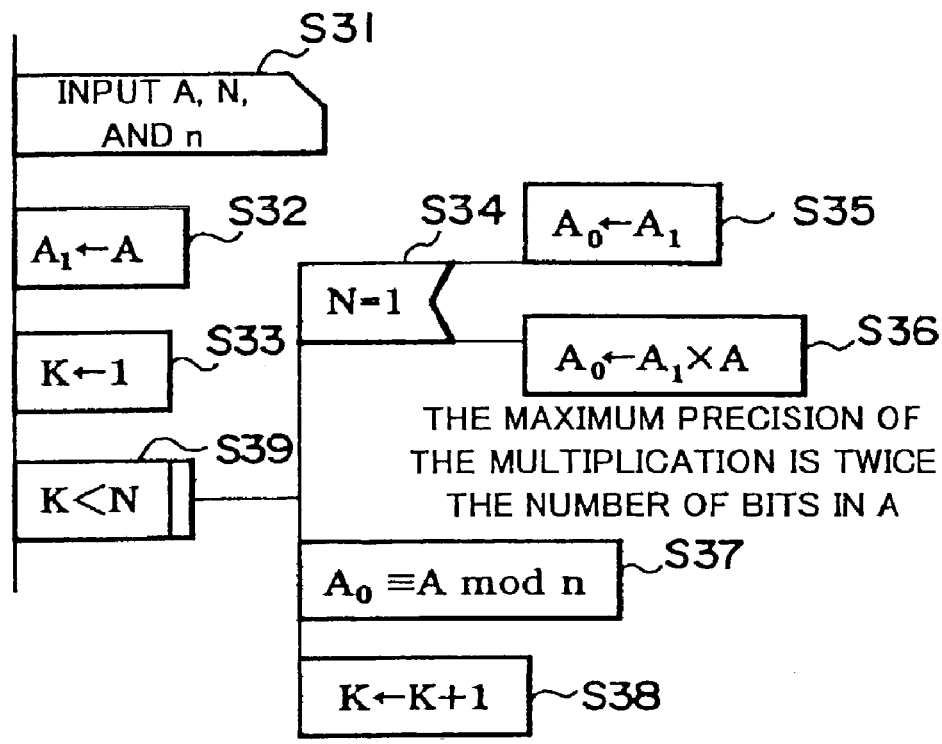
FIG. 11 shows the processing sequence of encryption and decryption in the public-key cryptosystem based on the RSA method in accordance with the second embodiment of the present invention.
FIG. 12 illustrates the number of gates necessary for a power residue arithmetic device.

It is well know that, since residue computations in an encryption/decryption system are done to an extremely high level of precision, the multiplication precision of a multiplier in one module is 16 bits and the division precision of a divider in one module is 32 bits, so the number of gates when four modules are incorporated within one unit (to give a variable precision of 16 to 64 bits for multiplication and 32 to 128 bits for division) is as shown in FIG. 12.

FIG. 12 shows that, 1700 gates are necessary for configuring a 32-bit precision divider of one module, so that the number of gates necessary for the arbitrary-precision division devices within one power residue arithmetic device is:

$$1700 \times 4 = 6800 \text{ (gates).}$$

FIG. 12 also shows that 1032 gates are necessary for configuring a 16-bit precision multiplier of one module, so that the number of gates necessary for the arbitrary-precision multiplication devices within one power residue arithmetic device is:

1032×4=4128 (gates).

Therefore, the total number of gates required for the power residue arithmetic device is:

6800+4128=10928 (gates).

This makes it possible to place one power residue arithmetic device on a single chip with approximately 12000 gates, including those required for the control circuit and dynamic connection circuit.

Note that eight units are necessary for 512-bit precision and 16 units are necessary for 1024-bit precision.

9. Computation Time

The description now concerns the time required for computing $a^b \equiv M \bmod c$ using the above described power residue arithmetic device, with reference to FIGS. 13A to 15.

Figure 5:
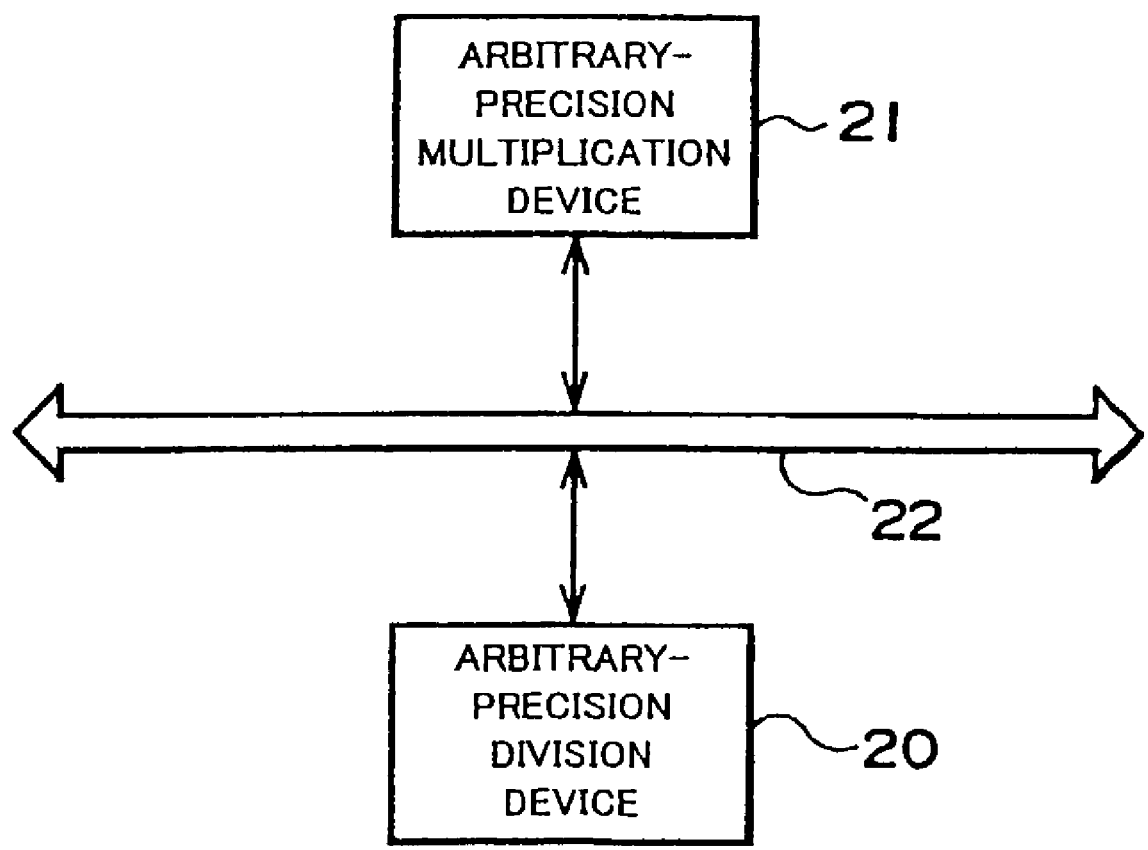
FIG. 5 is a schematic block diagram of the configuration of a power residue arithmetic device.

If the exponent b is n bits long, the computational processing necessary for the power residue computation can be broken down into the four multiplication and division steps indicated by (1) to (4) in FIG. 13A. In this case, the multiplications of steps (1) and (3) are done by an i-bit multiplier 21 shown in FIG. 13B and the divisions of steps (2) and (4) are done by a 2i-bit divider 20 shown in FIG. 13B. The multiplication precision of the multiplications of steps (1) and (3) is less than or equal to the maximum number of bits i in c, and the product thereof has a precision of twice the number of bits i in c, at most. Similarly, the division precision of the divisions (residue computations) of steps (2) and (4) is twice the number of bits i in c, at most. The i-bit multiplier 21 and the 2i-bit divider 20 have the same configuration as the arbitrary-precision multiplication device 21 and the arbitrary-precision division device 20 of FIG. 5.

Note that the input values in FIG. 13B are a, b, and c, and the register for storing M is initialized to an initial value of 1 for M. The values of a and M are input to the i-bit multiplier 21 for the computation of M←M×a mod c (when b=0), and the remainder when the result is divided by c is stored as M. For the computation of a←$a^2$ mod c (when b=1), $a^2$ is obtained by inputting two values of a to the i-bit multiplier 21.

In this case, the computations of $r1^2$, $r2^2$, $r3^3$, ... at (1) in FIG. 13A are done by the i-bit multiplier 21, and the remainders when $r1^2$, $r2^2$, ... are each divided by c at (2) in FIG. 13A are obtained by the 2i-bit divider 20 as intermediate values of M. At (3) in FIG. 13A, the multiplications k1=r1×r2, k2=R0×r3, k3=R1×r4, ... are done by the i-bit multiplier 21. Then the remainders when K1, K2, ... are each divided by c are obtained as R0, R1, ... (intermediate values of M) by the 2i-bit divider 20, and the remainder Rn−3 obtained by dividing kn−2 by c in the final stage becomes the target value of M.

Figure 13C:
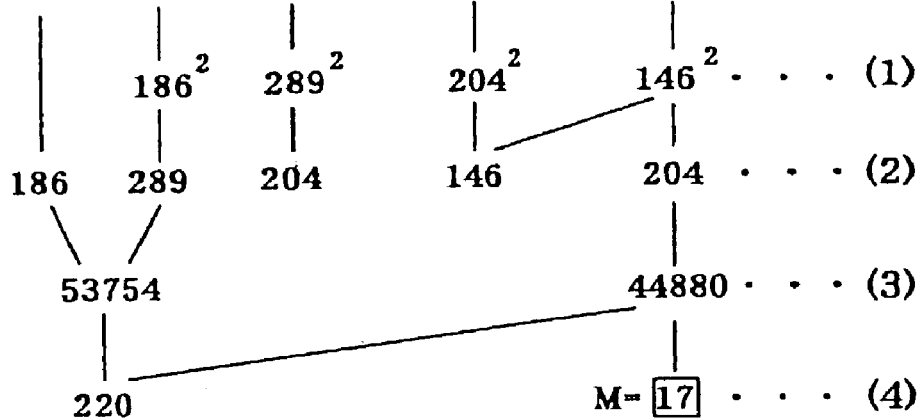
FIG. 13C is an illustrative view of an arithmetic example for decrypting $186^{19} \equiv M \bmod 377$ to obtain M=17, in accordance with the technique shown in FIG. 13A.

An actual example of these computations is shown in FIG. 13C. FIG. 13C shows the calculation sequence for obtaining M=17 by decrypting $186^{19} \equiv M \bmod 377$.

In FIG. 13C, the residue values "289", "204", "146", and "204" are each obtained as remainders when $186^2$, $289^2$, $204^2$, and $146^2$ are divided by 377. The products of (3) are obtained as 53,754=186×289 and 44,880=220×204. Then the value M=17 of (4) is obtained as the remainder when 44,880 is divided by 377.

If the maximum computation time required when all of a, b, and c in FIG. 13A have 1024 bits is expressed as the number of reference clock pulses that is necessary therefor, 1,047,552 clock pulses are necessary for the multiplication time in (1), 2,095,104 clock pulses are necessary for the residue computation time in (2), 1,047,552 clock pulses are necessary for the multiplication time in (3), and 2,095,104 clock pulses are necessary for the residue computation time in (4), making a total of 6,285,312 clock pulses, as shown in FIG. 14.

This means that the computation time is 95.2 ms when the reference clock frequency is 66 MHz.

Similarly, the computation time when a and b each have 1024 bits and the number of bits in the exponent b is 512 bits or 9 bits is 47.6 ms or 0.7 ms, respectively, as shown in FIG. 15. It should be noted, however, that these computation times are results derived when each product and residue is obtained to the maximum precision, so in practice these values will be smaller.

This second embodiment of the invention makes it possible to configure a power residue arithmetic unit that can perform power residue computations at a multiplication precision of $2^m$ bits (where m is a natural number) and a division precision of $2^{2 \times m}$ bits, and encryption and decryption at a $2^n$-bit precision can be performed by connecting x numbers of these power residue arithmetic unit in a manner such that the following equation is satisfied:

$x=2^n/2m$ (where n is a natural number and x is a natural number).

It is therefore possible to expand the system in a simple hardware manner.

Note that the above relational expression of x is that when the maximum arithmetic precision of the power residue arithmetic unit is equal to the arithmetic precision that is required, but the same effects can be obtained by adding a margin to this computational capability when x power residue arithmetic units are connected together in a manner such that the following inequality is satisfied:

$x>2^n/2^m$ (where n is a natural number and x is a natural number).

In addition, if it is required to have a precision $2^{n1}$ (where n1 is a natural number, and also, n1≦n) that is lower than the maximum possible bit precision $2^n$ of the power residue arithmetic unit, the power consumption can be optimized by not supplying power to power residue arithmetic units that are not necessary for the computations, and also the computation time can be optimized, by cascading x1 numbers of power residue arithmetic units in a manner such that the following inequality is satisfied:

$x \geq x1 \geq 2^{n1}/2^m$ (where x1 is a natural number).

It is also possible to configure the system of y numbers of cascadable power residue arithmetic modules that can perform power residue computations at a multiplication precision of $2^{m/y}$ and y numbers of those with a division precision of $2^{2 \times (m/y)}$. The power consumption and computation time can be optimized in such a case by cascading only $y1 \geq 2^{n1}/2^{m/y}$ numbers of the power residue arithmetic units that is sufficient for performing encryption and decryption at a $2^{n1}$-bit precision, out of the total number of power residue arithmetic modules that are connected together.

This second embodiment of the invention also makes it possible to achieve a precision of 512 to 1024 bits, using only single chips with a gate count of approximately 12,000 gates, in which arbitrary-precision dividers have a 128-bit precision and implement divisions by distributed processing and arbitrary-precision multiplier have a 64-bit precision, by cascading 8 to 16 of these multiplication/division units (chips). Higher precisions can be implemented simply, in a similar manner.

Since it is possible to execute computations at a precision that is proportional to the number of clock pulses (such as 512 clock pulses for a 512-bit precision) and configure all of the hardware on a board, higher speeds can be achieved.

It is also possible to construct an encryption/decryption system in a simple manner on each personal computer system, and thus it is possible to implement an encryption/decryption system that is suitable from the information security viewpoint.

The description above concerned a case in which a maximum of x power residue arithmetic units were provided, but if the power residue arithmetic units are configured of thin film transistors (TFTs), by way of example, and damage or another cause has made one transistor inoperative so that one power residue arithmetic unit cannot be used, this would mean that none of the power residue arithmetic units can be used, which will reduce the effective yield and lead to an increase in fabrication costs.

For a yield of power residue arithmetic units of A in such a case, it is preferable to use a redundant configuration such that at least K (where $x \geq K/A$) power residue arithmetic units are provided in advance and x numbers of these K power residue arithmetic units that are operative are connected together. If one of the power residue arithmetic modules in this configuration is found to be inoperative, a redundant power residue arithmetic unit can be switched into the connection and the corresponding power residue arithmetic unit can be handled as a operative unit.

It should be obvious that this applies not only to power residue arithmetic units, but also to the power residue arithmetic modules making up each of these power residue arithmetic units. In other words, for a yield of power residue arithmetic modules of A', a redundant configuration is employed in which at least L (where $y \geq L/A'$) power residue arithmetic modules are provided in advance and y numbers of these L power residue arithmetic modules that are operative are connected together. Thus, if one of the power residue arithmetic modules in this configuration is found to be inoperative, a redundant power residue arithmetic module can be switched into the connection and the corresponding power residue arithmetic unit can be handled as a operative unit.

The description above concerned applications in which RSA encryption was used as the public-key cryptosystem, but it is also possible to utilize elliptical-curve encryption in a similar manner.

Third Embodiment

In the above described second embodiment, all of the power residue arithmetic devices were provided as external additions to a personal computer system, but this third embodiment concerns a configuration in which some of the power residue arithmetic devices are installed beforehand in the personal computer system, an expansion slot for power residue arithmetic units for expanding the precision is also provided in the personal computer system, and the simply arithmetic precision can be expanded by inserting power residue arithmetic units into the expansion slot, in a similar manner to expanding memory by using a memory expansion slot.

More specifically, a motherboard of the personal computer system 12 shown in FIG. 4 is provided with internal power residue arithmetic units capable of performing power residue computations at a multiplication precision of $2^{m1}$ bits (where m1 is a natural number and is fixed) and a division precision of $2^{2 \times m1}$ bits, together with an expansion slot for power residue arithmetic units that acts as cascade connection terminals for cascading external power residue arithmetic units capable of performing power residue computations at a multiplication precision of $2^{m2}$ bits (where m2 is a natural number and is fixed) and a division precision of $2^{2 \times m2}$ bits. External power residue arithmetic units are connected to the expansion slot for power residue arithmetic units in a manner such that the following inequality is satisfied:

$$z \geq (2^n - 2^{m1})/2^{m2} \text{ (where n and z are natural numbers and are fixed).}$$

As a result, it is possible to perform encryption and decryption in a simple manner at $2^n$-bit precision. These external power residue arithmetic units can also be modified in various ways, as previously described with respect to the second embodiment.

The descriptions of the above embodiments dealt with cases in which the present invention is implemented by personal computers, but it can also be applied in a similar manner to workstations, measuring equipment, and computers incorporated into equipment such as domestic appliances.

Fourth Embodiment

The description now turns to optical transmission within a single chip, as mentioned in the first to third embodiments.

Figure 17:
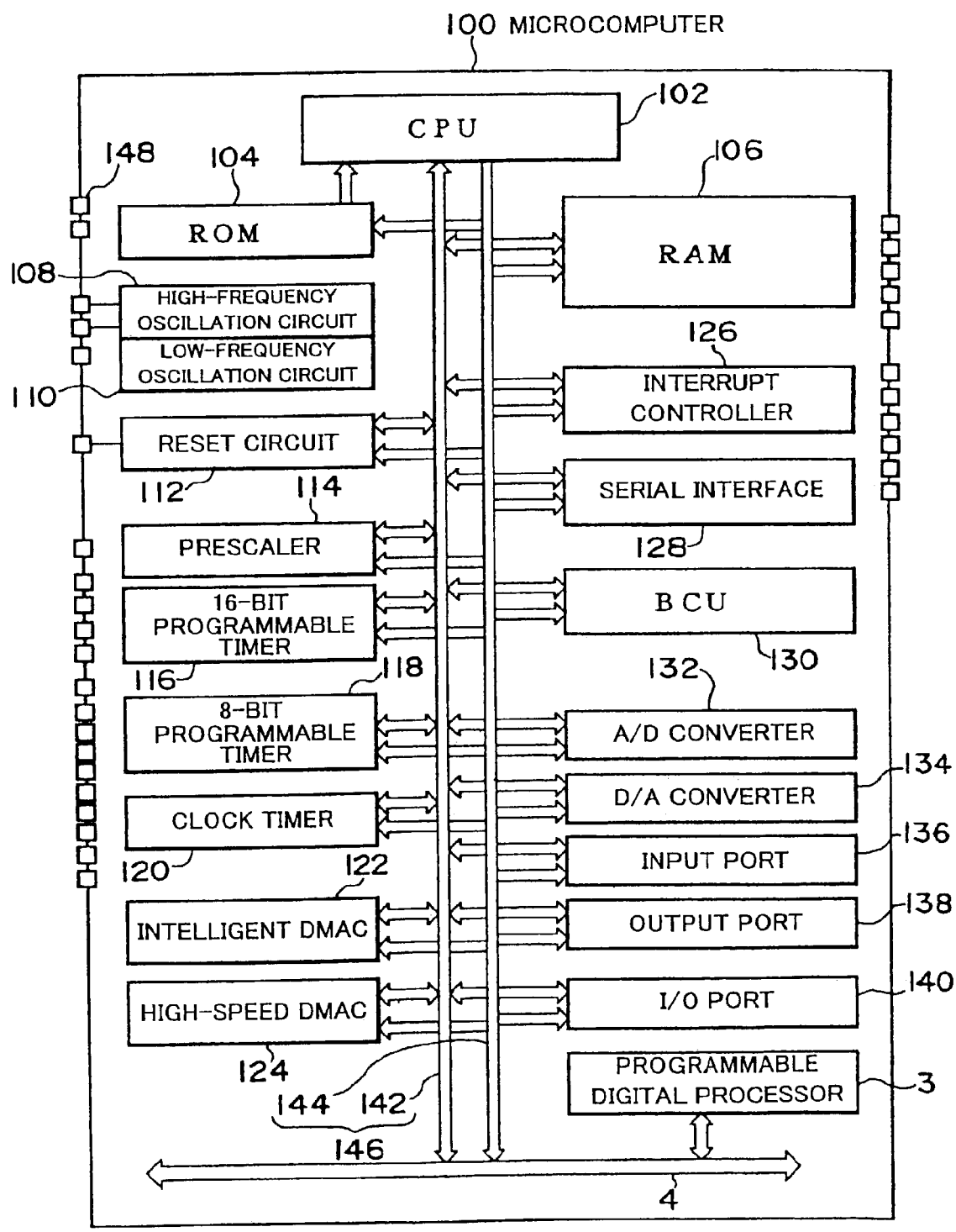
FIG. 17 is a block diagram of a microcomputer in accordance with a fourth embodiment of the present invention.

Outline of Microcomputer:

A block diagram of an example of a microcomputer 100 that is an information processing system to which the present invention is applied is shown in FIG. 17.

The microcomputer 100 shown in FIG. 17 comprises the various functional units described below. That is to say, the interior of the microcomputer 100 is provided with a central processing unit (CPU) 102; read-only memory (ROM) 104; random access memory (RAM) 106 used as cache memory; a high-frequency oscillation circuit 108; a low-frequency oscillation circuit 110; a reset circuit 112; a prescaler 114; a timer circuit comprising a 16-bit programmable timer 116, a 8-bit programmable timer 118, and a clock timer 120; data transmission control circuitry comprising an intelligent direct memory access controller (DMAC) 122 and a high-speed DMAC 124; an interrupt controller 126; a serial interface 128; a bus control unit (BCU) 130; an analog interface circuit comprising an analog-digital (A/D) converter 132 and a digital-analog (D/A) converter 134; and I/O circuitry comprising an input port 136, an output port 138, and an input-output (I/O) port 140. In addition, the microcomputer 100 comprises an internal bus line 146 comprising a data bus 142 and an address bus 144, that connects the CPU 102 to the other functional units 104 to 140, and various terminals. All of these components are formed on a single semiconductor substrate. Note that the data bus 142 and the address bus 144 are shown separately in FIG. 17, but a single line could be used as a common data/address bus, for transmitting both data and addresses, if the data and addresses are transmitted in a time division manner.

The internal bus line 146 shown in FIG. 17 is connected to the internal bus 4 of FIG. 2, whereby all of the above. components are connected to a programmable digital processor 3.

Transmission of Optical Signals between Functional Units:

The present embodiment is characterized in that signals transmitted by the data bus 142, the address bus 144, and the internal bus 4 are optical signals. In other words, multi-channel data such as 32-bit data is handled as optical signals of different wavelengths which are transmitted simultaneously in an optical manner within the data bus 142 formed as an optical transmission medium. Similarly, address signals are handled as optical signals of different wavelengths which are transmitted simultaneously in an optical manner within the address bus 144. Note that if a single optical transmission medium is used in common for the data bus 142 and the address bus 144, data and addresses in the optical signal are transmitted in a time division manner.

In such a case, all of the above described functional units 102 to 140 operate in accordance with multi-channel optical signals to implement their various functions, as in the conventional art, and thus can be formed as semiconductor components or the like. To that end, each of the functional units 102 to 140 is provided with one or both of a signal input section for converting multi-channel electrical signals that are input through the internal bus line 146 (the data bus 142 and/or the address bus 144) into multi-channel electrical signals, and a signal output section for converting multi-channel electrical signals into multi-channel optical signals.

Figure 18:
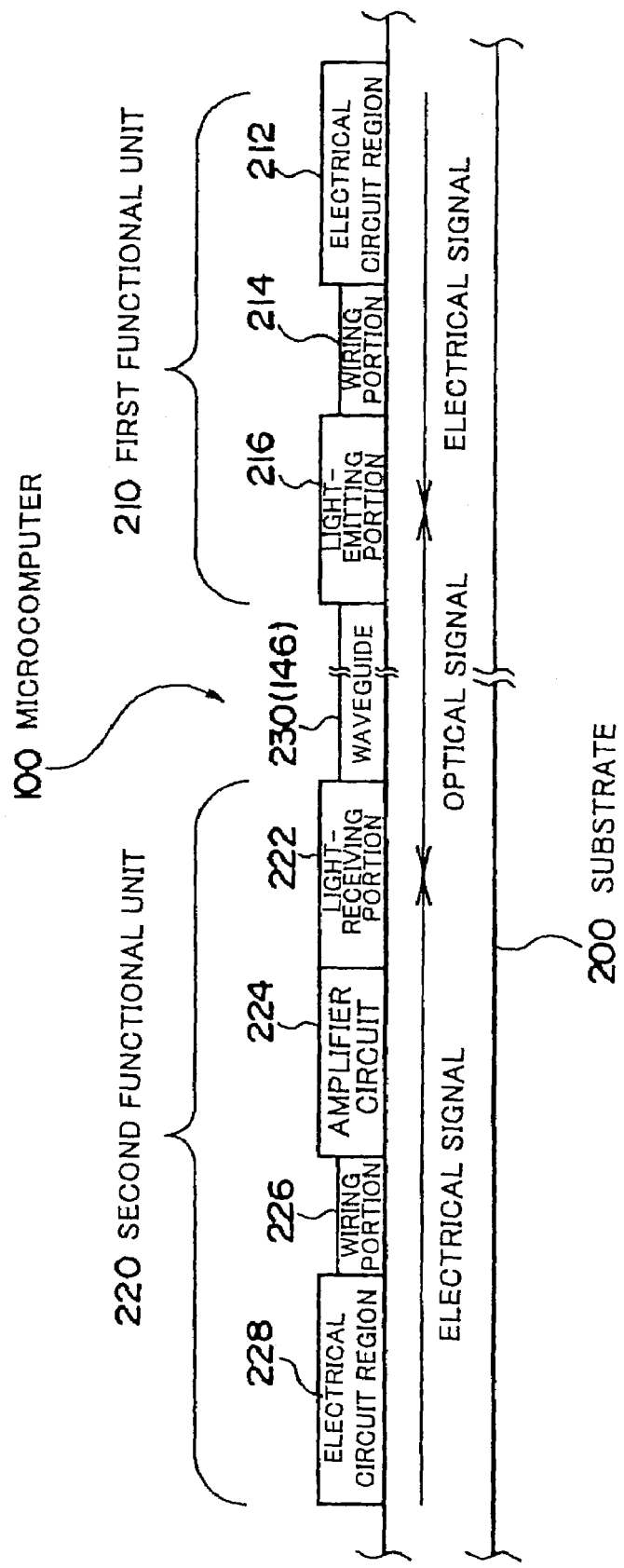
FIG. 18 is a schematic illustrative view of a region comprising the optical transmission sections of the microcomputer of FIG. 17.

Part of a substrate 200 on which is formed the microcomputer 100 is shown schematically in FIG. 18. This FIG. 18 shows a configuration in which a signal is transmitted through the internal bus line 146 from a first functional unit 210 (one of the functional units 102 to 140) formed on the substrate 200 to a second functional unit 220 (another of the functional units 102 to 140).

The first functional unit 210 comprises a electrical circuit region 212, a wiring section 214 that transmits an output signal (multi-channel electrical signals) from this electrical circuit region 212, and a light-emitting section 216 that acts as a signal output section for outputting an optical output that is multi-channel optical signals having different wavelengths based respectively on multi-channel electrical signals.

The second functional unit 220 comprises a light-receiving section 222 that acts as a signal input section for converting multi-channel optical signals, into multi-channel electrical signals, an amplifier circuit 224 for amplifying the multi-channel electrical signals, a wiring section 226 for transmitting this electrical signal, and an electrical circuit region 228. Note that the amplifier circuit 224 functions as a level shifter for shifting the voltage level of the electrical signal from the light-receiving section 222 to the voltage level necessary for the second functional unit 220, and is provided as necessary.

The internal bus line 146 formed between the light-emitting section 216 and the light-receiving section 222 is configured as a waveguide 230 that is an optical transmission medium which can transmit multi-channel optical signals simultaneously.

To enable the light-emitting section 216 shown in FIG. 18 to convert multi-channel electrical signals into multi-channel optical signals, it is provided with a number of light-emitting elements corresponding to the number of channels. In a similar manner, the light-receiving section 222 has light-receiving elements corresponding to the number of channels.

Note that signals can be transmitted in both directions between the first and second functional units 210 and 220. In such a case, the first functional unit 210 is provided with a light-receiving section connected optically to the waveguide 230 that is the optical transmission medium in FIG. 18, as well as an amplifier for amplifying an electrical signal from that light-receiving section. Similarly, the second functional unit 220 is provided with a light-receiving section 222 that is connected optically to the waveguide 230.

Figure 19:
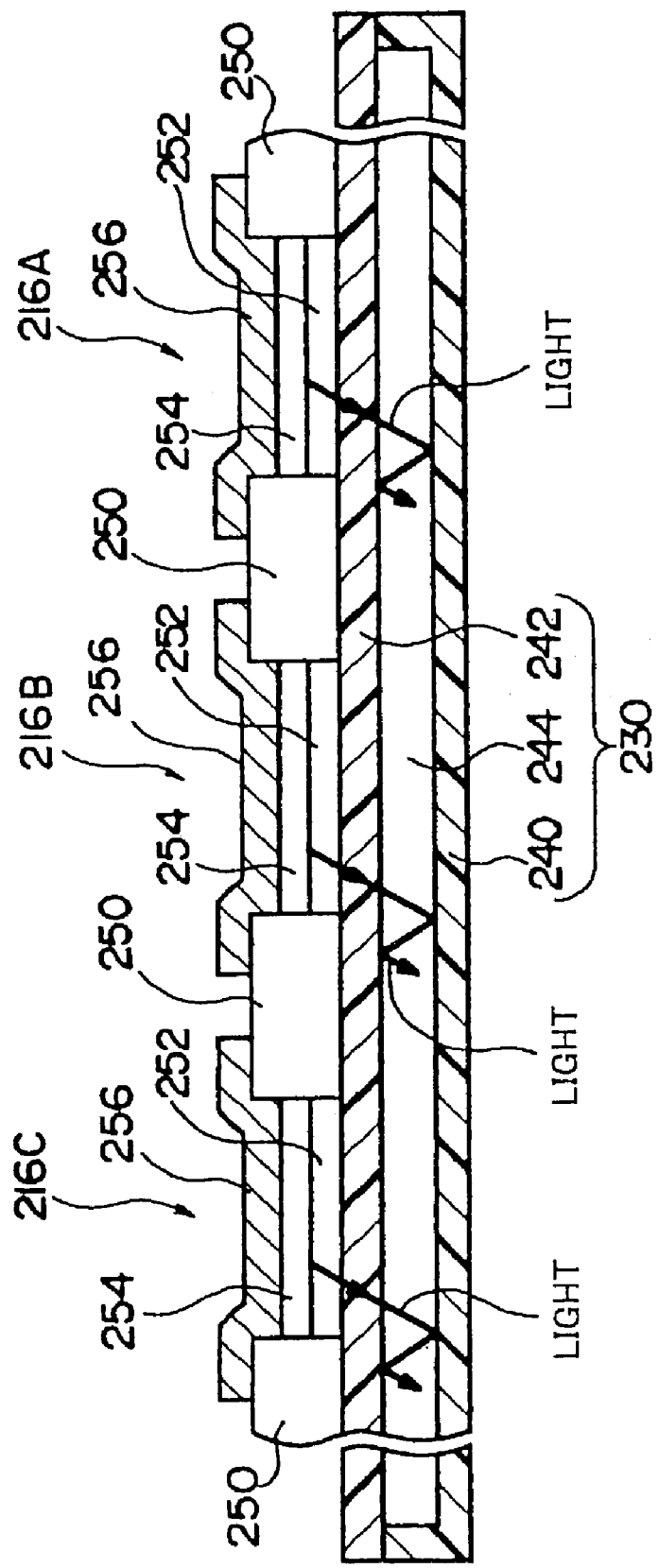
FIG. 19 is a schematic illustrative view of light-emitting elements for three channels making up the light-emitting section of FIG. 18.

A cross-section through an example of three light-emitting elements 216A to 216C and the waveguide 230, which is part of the light-emitting section 216 of FIG. 18, is shown in FIG. 19. FIG. 19 shows a state in which light-emitting elements 216A to 216C for three channels are formed on top of the common waveguide 230.

In FIG. 19, the waveguide 230 is configured in a manner such that a transparent electrode layer 244 formed of a material such as indium tin oxide (ITO) is provided as a core between a lower $SiO_2$ layer 240 and an upper $SiO_2$ layer 242. Note that all of the outer surfaces of the ITO layer 244 that forms the core are covered by the $SiO_2$ layer 240 and the $SiO_2$ layer 242, preventing the leakage of light therefrom.

Since the light-emitting elements 216A to 216C have essentially the same configuration, apart from the composition and materials of some of the layers, as will be described later, the description below deals only with the light-emitting element 216A. The light-emitting element 216A comprises banks 250 for delimiting the light-emitting sections of the channels, on top of the upper SiO2 layer 242. Between these banks 250 are formed an ITO layer 252 and a light-emitting layer 254 in sequence, and metal electrodes 256 (of, for example, Al—Li) are formed to cover parts of the light-emitting layer 254 and the banks 250. Note that a optical filter that allows the passage of only wavelengths within a narrow band could be provided below the ITO layer 252. In this manner, a plurality of light-emitting elements 216A to 216C and so on, which are optically isolated by the banks 250, are formed on the waveguide 230.

The light-emitting layer 254 of the light-emitting element 216A is formed of an organic electroluminescence (EL) material, by way of example. This organic EL is formed by ejection from inkjet nozzles 258 onto the ITO layer 252 to a thickness of approximately 0.1 μm, by way of example. By selecting the organic EL material, the wavelength of light emitted from the light-emitting layer 254 of the light-emitting element 216A of a certain channel can be made different from the wavelengths of light emitted from the light-emitting elements 216B, 216C, etc., of all the other channels.

Using organic EL as the light-emitting layer 254 increases the freedom with which the wavelengths of the emitted light can be selected, and in fact it is possible to select any desired wavelength by selecting a specific material or compounding materials.

For the organic light-emitting material, the energy of an exciter within the light-emitting material can be selected to be suitable for the energy difference between the highest occupied molecular orbital (HOMO) and the lowest unoccupied molecular orbital (LUMO) corresponding to the forbidden band of an organic substance. For example, a low-molecular weight material, a high-molecular weight material (particularly a conjugate high-molecular weight material achieved by conjugation of a principal chain), conductive molecules, or pigment molecules can be selected therefor.

If a low-molecular weight organic material is used as the organic light-emitting material, anthracene, PPCP, $Zn(O_xZ)_2$, distyrylbenzene (DSB), a derivative thereof (PESB), or the like could be used for emitting blue light. Similarly, BPPC, perylene, DCM, or the like could be used for emitting red light.

If a high-molecular weight organic material is used as the organic light-emitting material, PAT or the like could be used for emitting red light; MEH-PPV could be used for emitting orange light; PDAF, FP-PPP, RO-PPP, PPP, or the like could be used for emitting blue light; and PMPS or the like could be used for emitting purple light.

Other materials that could be used as the organic light-emitting material include PPV, RO-PPV, CN-PPV, PdphQ$_x$, PQ$_x$, poly-N-vinylcarbazol (PVK), PPS, PNPS, and PBPS.

In particular, PVK can be modified to give any oscillation wavelength (light-emitting color), by controlling the mixing density and number of ink injections of a dopant ink such as pigment molecules, which have a poor carrier transport capability in a Eu complex. The color that is generated can be adjusted by doping a fluorescent pigment into an organic light-emitting material formed of PVK, by way of example.

If the configuration is such that rhodamine B or DCM can be doped into PVK, the color that is generated can be modified as desired from green to red.

In addition the wavelength of the light (the peak wavelength or wavelength band thereof) can be adjusted to a certain degree by an additional optical filter disposed below the ITO layer 252 of FIG. 19.

If light of a wide wavelength band, such as white light, is emitted and the wavelength thereof is adjusted, an absorbent optical color filter can usually be used as the above described optical filter and this can be adjusted so that only light of a desired color (wavelength) is passed therethrough as an optical signal.

A distributed reflective multi-layer mirror (DBR mirror) could be used as the additional optical filter disposed below the ITO layer 252. This DBR mirror is a stack of a plurality of thin films having different refractive indices, and, in particular, comprises a plurality of pairs of thin films having different refractive indices. The compositions of these thin films could be semiconductor or dielectric materials, by way of example, but dielectric materials are preferred. These could be formed by using a usual vacuum film-formation method or liquid-phase film-formation method. A soluble organic compound in an organic solvent could be used as the starting material for the dielectric material, in which case it is possible to apply a pattern by the inkjet method shown in FIG. 20.

The light-emitting elements 216A to 216C could also be formed of vertical-cavity surface-emitting lasers. Such a surface-emitting laser is formed of a stack of alternate cladding layers and active layers (preferably of a quantum well structure) formed between two mirrors of different reflectivities, such as two distributed reflective multi-layer (DBR) mirrors (in the example shown in FIG. 19, the lower mirror has a lower reflectivity), with contact layers disposed between each of the upper and lower mirrors and corresponding upper and lower electrodes (in the example shown in FIG. 19, the lower electrode is a transparent electrode made of a material such as ITO).

Note that details of this type of surface-emitting laser have already been disclosed by the present inventors in Japanese Patent Application No. 10-2012415, Japanese Patent Application No. 10-201244, and Japanese Patent Application Laid-Open No. 7-198203, etc., so further description thereof is omitted.

Figure 20:
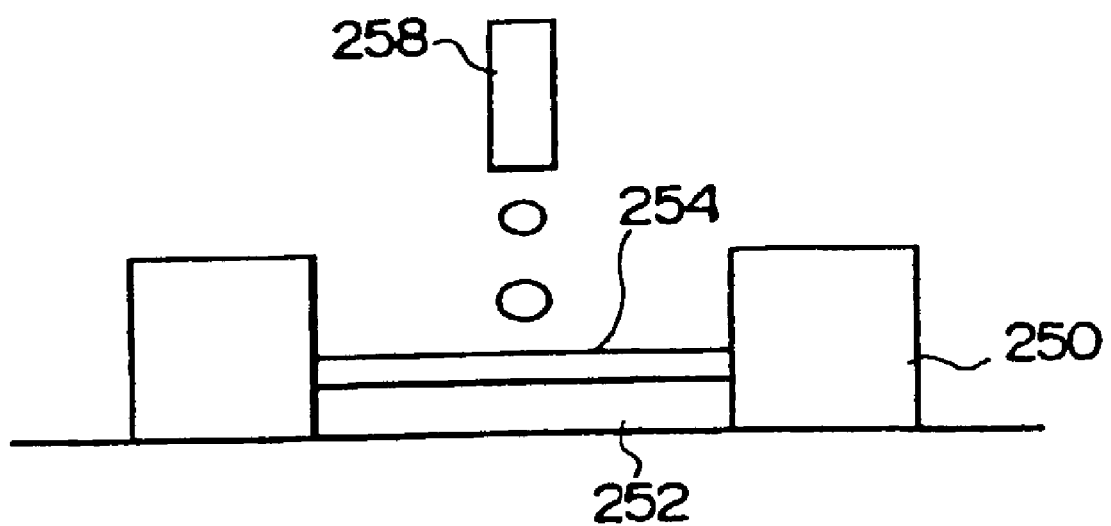
FIG. 20 is a schematic illustrative view of an example of the fabrication of the light-emitting layer of FIG. 19.

It is possible to modify the light-emitting wavelength of the surface-emitting laser of each channel by selecting the composition of a material grown by epitaxial growth, such as GaAlAs, and a plurality of surface-emitting lasers of different compositions could be created on top of the waveguide 230 by patterning with the inkjet method shown in FIG. 20.

Figure 22:
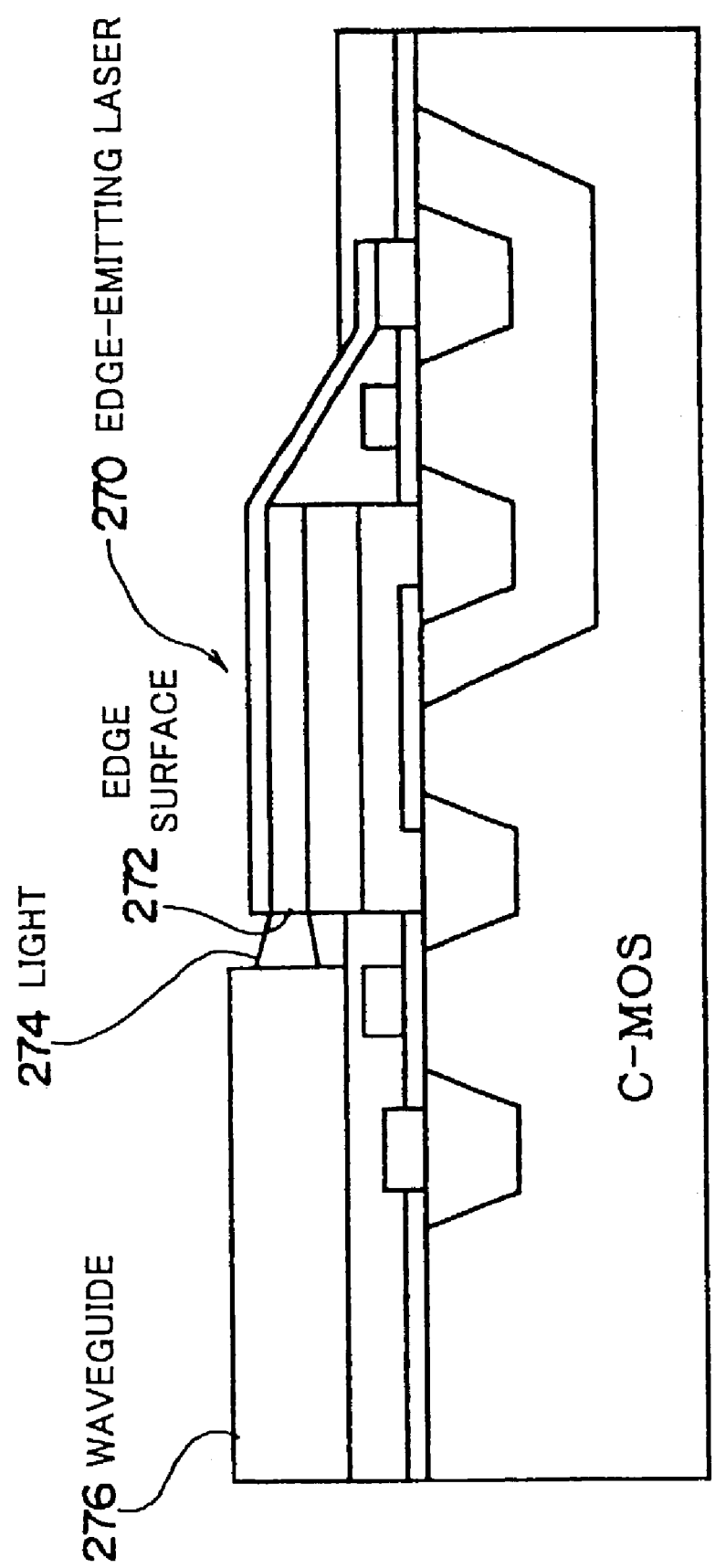
FIG. 22 is a schematic illustrative view of a modified example of the light-emitting section of FIG. 18.

Another example of the light-emitting element 216A could use a edge-emitting laser 270, as shown in FIG. 22.

Light 274 emitted from an edge surface 272 of this edge-emitting laser 270 is propagated within a waveguide 276 formed in an optical transmission medium of a material such as ITO. The wavelength of light emitted by the edge-emitting laser of each channel can be modified by selecting the composition of the construction material thereof.

Figure 21:
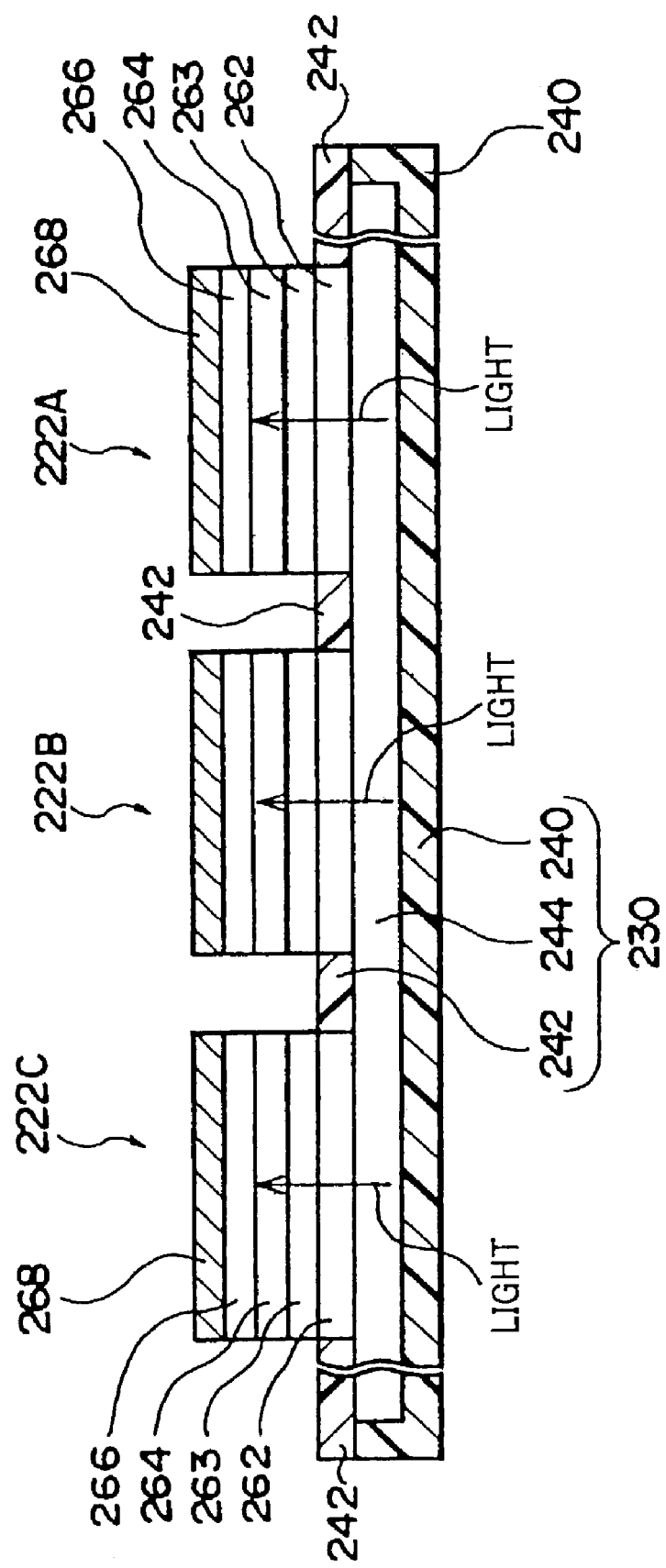
FIG. 21 is a schematic cross-sectional view of light-receiving elements for three channels making up the light-emitting section of FIG. 18.

FIG. 21 shows an example of light-receiving elements 222A to 222C for three channels provided on top of an extension of the waveguide 230 of FIG. 19. Since these light-receiving elements 222A to 222C have essentially the same configuration, apart from the composition and materials of some of the layers, as will be described later, the description below deals only with the light-receiving element 222A. This light-receiving element 222A comprises an optical filter 262, an ITO layer 263 acting as a transparent electrode, a first conductive semiconductor layer such as an n-type GaAlAs layer 264, and a second conductive semiconductor layer such as a p-type GaAlAs layer 266, formed on the ITO layer 244 in a region away from the upper SiO2 layer 242 of the waveguide 230.

In this case, the first and second conductive semiconductor layers 264 and 266 form a PIN photodiode. Another example of the configuration of this PIN photodiode could comprise a p-type a-SiC (p-type semiconductor), an i-type a-Si layer, and an n-type a-SiC layer. In such a case, a Al—Si—Cu layer could be used as the metal electrode 268.

The optical filter 262 comprises at least two layers, such as a first optical filter that allows the passage of light of a wavelength greater than or equal to X1 nm and a second optical filter that allows the passage of light of a wavelength less than or equal to X2 (>X1) nm, by way of example, to function as a narrow-band optical filter for passing light of wavelengths between X1 nm and X2 nm. Note that the configuration of the optical filter 262 could also be such that an additional optical filter disposed below the ITO layer 252 of FIG. 19 is used therefor. Conversely, one of the materials described for the optical filter disposed additionally below the ITO layer 252 of FIG. 19 could be used in the optical filter 262.

The above configuration ensures that light of a specific wavelength that has been propagated by the waveguide 230 and passed through the optical filter 262 is converted from light into a current at the depletion layer formed at the boundary between the first and second conductive semiconductor layers 264 and 266, and that electrical signal can be extracted through the electrodes 263 and 268.

Incidentally, the wavelength of the light that passes through the optical filter 262 can be modified by a suitable selection of the material of which it is constructed. In addition, the wavelength of the light that can be detected by the photodiode formed of the first and second conductive semiconductor layers 264 and 266 can be modified by selecting the composition of the material thereof, such as GaAlAs. This ensures that the wavelength of light detected by the light-receiving element 222A of one channel is different from the wavelengths detected by the light-receiving elements 222B, 222C, etc., of all the other channels. Note that the optical filter 262 and the first and second conductive semiconductor layers 264 and 266 could be formed by a film-formation method using the inkjet nozzles 258 shown in FIG. 20. Alternatively, the light-receiving elements 222A, 222B, and 222C that detect different wavelengths could be mounted on the waveguide 230.

Description of Microcomputer Operation

If the CPU 102 of FIG. 17 is to read data from the RAM 106 which is acting as cache memory, for example, signals such as a chip enable or chip select signal from the CPU 102 to select the RAM 106 and address signals to be read out are output as multi-channel electrical signals.

In this case, if the first functional unit 210 of FIG. 18 is the CPU 102, the multi-channel electrical signals therefrom are output by the electrical circuit region 212 of FIG. 18. These multi-channel electrical signals are input to the light-emitting section 216 through the wiring section 214. The light-emitting elements that form the light-emitting section 216 each input one of the channels of the electrical signal through the metal electrode 256 thereof, and an optical signal of that channel's own wavelength is emitted by the corresponding light-emitting layer 254. This generates an optical signal that is controlled for each channel from the light-emitting layer 254, and these signals are incident on the waveguide 230 through the ITO layer 252. The waveguide 230 propagates light through the ITO layer 244 that forms the core thereof, as shown in FIG. 19.

If the second functional unit 220 of FIG. 18 is assumed to be the RAM 106, the optical signal propagated through the waveguide 230 is incident on the light-receiving section 222 thereof. In this case, each of the light-receiving elements 222A to 222C that make up the light-receiving section has the optical filter 262 which passes light of the corresponding wavelength, so that only light of wavelength corresponding to each channel is incident on the light-receiving elements 222A to 222C that are disposed to correspond to the number of channels. In addition, each of the light-receiving elements 222A to 222C is configured to detect light of the wavelength that has passed through the corresponding optical filter 262, so that an electrical signal for each channel is output therefrom.

The RAM 106 operates electrically thereafter, in a similar manner to a conventional LSI, so that the necessary data is read out from the RAM 106. Electrical signals that have been read from the RAM 106 are converted by the light-emitting section on the second functional unit 220 side, omitted from FIG. 18, and are propagated through the waveguide 230 of FIG. 18. These optical signals are converted into electrical signals by the light-receiving section on the first functional unit 210 side, then are supplied to the CPU 102 through an amplifier.

In this manner, losses in transmission speeds can be substantially ignored, because signals are transferred as light between the functional units within the microcomputer 100 acting as an information processing system. This means that it is not necessary to design from considerations of transmission delays, even if the trend for higher levels of integration continues, greatly facilitating the structural design of circuitry. Moreover, the amount of heat generated by the microcomputer 100 can be reduced by this transfer of signals as light between the functional units within the microcomputer 100.

Note that it is also possible to have a configuration in which optical communications are used between the microcomputer 100 or FIG. 17 and peripheral equipment. This peripheral equipment could be a display section such as an LCD or CRT, or a printer or the like.

In such a case, the input port 136, the output port 138, and the I/O port 140 of FIG. 17 could be configured to input and output multi-channel optical signals with respect to the internal bus line 146. The configuration in this case could be such that an optical shutter is provided for each of these ports, to close off the path when optical signals are not being input or output therethrough, and this optical shutter is opened only when peripheral equipment specifies it, by means of a chip select signal or the like.

Fifth Embodiment

A fifth embodiment of the present invention relates to a system LSI wherein a plurality of functional units, which are integrated onto a single chip as an LSI in the art, are distributed between different semiconductor devices.

Figure 23:
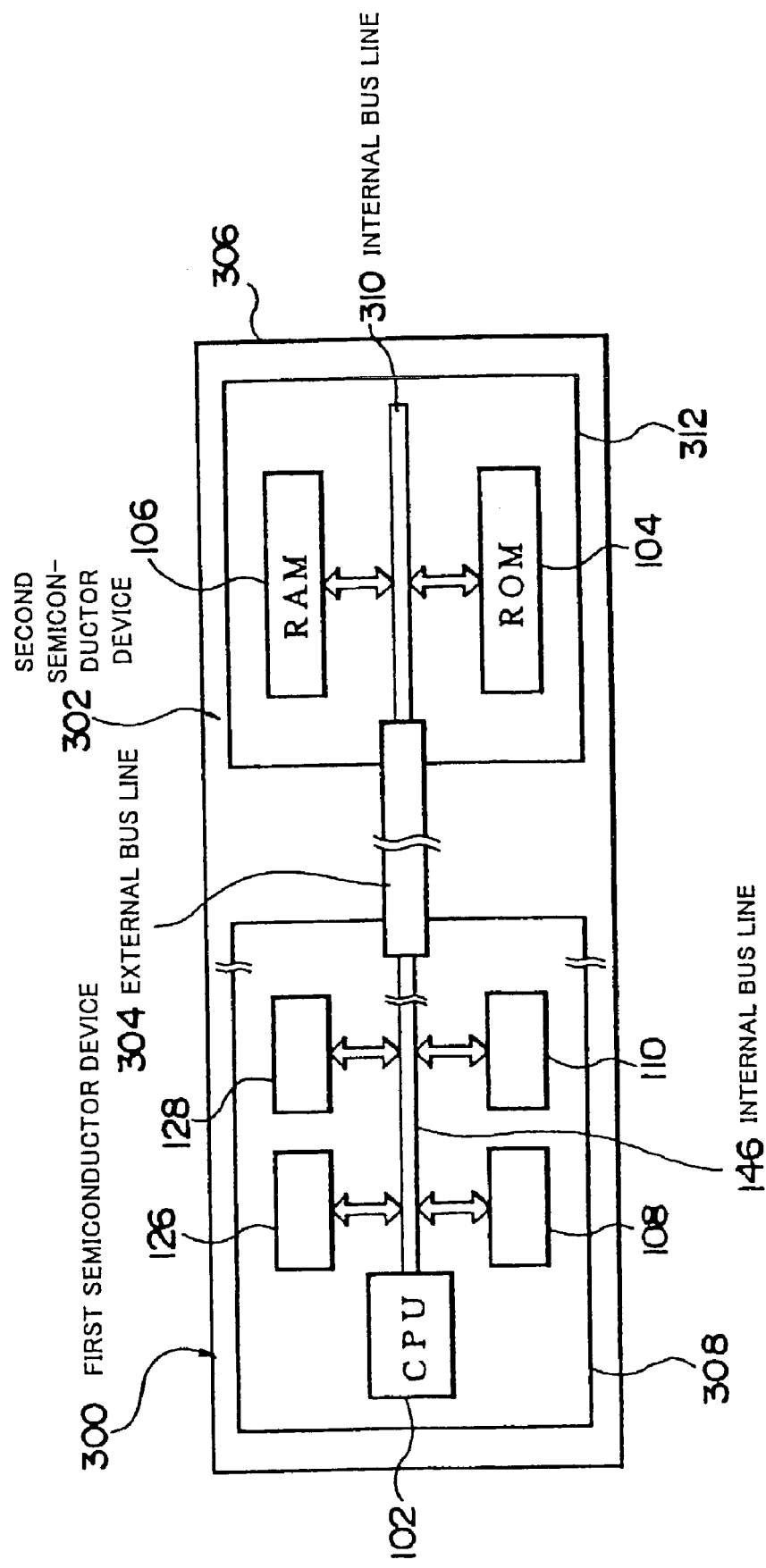
FIG. 23 is a schematic illustrative view of a system LSI in accordance with a fifth embodiment of the present invention.

In a layout shown in FIG. 23, a system LSI formed on a base substrate 306 is configured of a first semiconductor device 300 that forms part of the microcomputer 100 of FIG. 17 and a second semiconductor device 302 that forms all or part of the remainder thereof, and the first and second semiconductor devices 300 and 302 are connected together by a external bus line 304. In addition to the waveguide 230 shown in FIG. 18, the external bus line 304 could be formed of an optical fiber, for example, and signals can be transmitted between the first and second semiconductor devices 300 and 302 by light. Note that a plurality of functional units are disposed within each of the first semiconductor device 300 and the second semiconductor device 302, and signals are transmitted between the functional units within each semiconductor device by light, in a similar manner to the first embodiment.

In this case, at least the RAM 106 of FIG. 17 acting as a cache memory, the ROM 104, and an internal bus line 310 formed is of an optical transmission medium are disposed within the second semiconductor device 302 of FIG. 23, mounted on a second substrate 312. Similarly, the CPU 102 and the internal bus line 146 of FIG. 17, together with the functional units 108 to 140 that are not incorporated in the second semiconductor device 302, are provided within the first semiconductor device 300 of FIG. 23 and are mounted on a first substrate 308.

This configuration makes it possible to transmit data and addresses through the internal bus line 146 as optical signals between the CPU 102 within the first semiconductor device 300 and the other functional units 108 to 140 incorporated within the first semiconductor device 300. Similarly, data and addresses can be transmitted as optical signals between the CPU 102 within the first semiconductor device 300 and the ROM 104 and RAM 106 within the second semiconductor device 302 through the internal bus line 146 within the first semiconductor device 300, the external bus line 304, and the internal bus line 310 within the second semiconductor device 302.

This makes it possible to remove at least one of the functional units that have to be accommodated within the single chip with the CPU 102 in the art, and place it externally, and also makes it possible to ignore transmission delays between the CPU 102 and the functional units 104 and 106 that have been relocated externally. This also makes it possible to have a lower level of integration for the first semiconductor device 300 on a single chip, improving the yield and also making it possible to externally attach functional units that are accessed directly by the CPU 102, such as the ROM 104 and RAM 106. It is therefore possible to freely design additional functions to be attached as external components, while keeping the basic single-chip design concept in common. Note that the functional units incorporated within the second semiconductor device 302 are not limited to memory components as described above.

Sixth Embodiment

Figure 24:
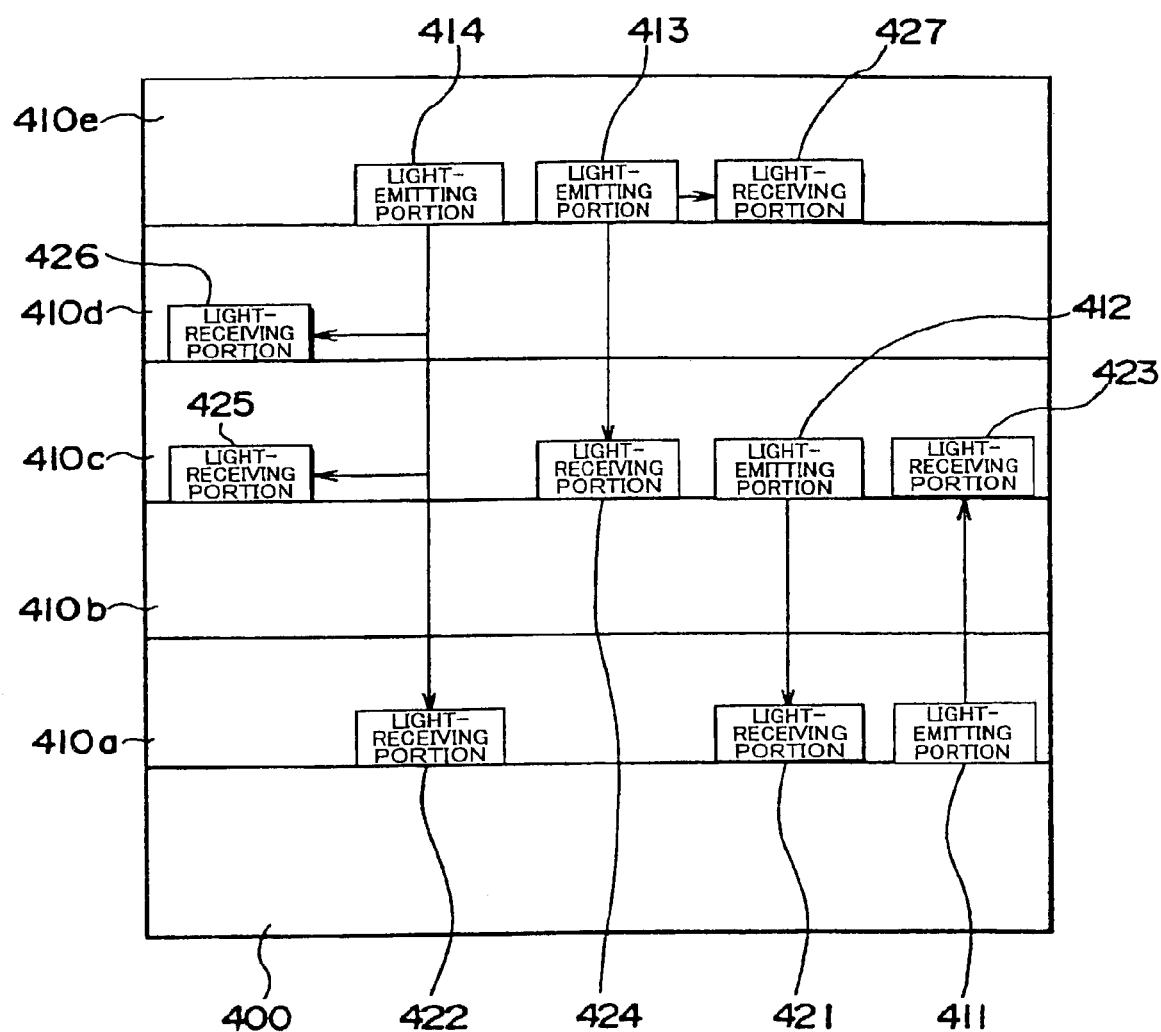
FIG. 24 is a schematic illustrative view of a sixth embodiment of the present invention, in which light-emitting sections, waveguides, and light-receiving sections are disposed three-dimensionally.

A schematic illustrative view of a sixth embodiment of the present invention is shown in FIG. 24. As shown in FIG. 24, the light-emitting sections, light-receiving sections, and waveguides of the present embodiment are disposed in a three-dimensional manner. In FIG. 24, first to fifth layers 410a to 410e are formed on a substrate 400. The relationship between a light-emitting section 413 and a light-receiving section 427 in the fifth layer 410e is the same as the relationship between the light-emitting section 216 and the light-receiving section 222 connected by the horizontal waveguide 230 of FIG. 18. The relationship between the light-emitting section 413 and a light-receiving section 424, the relationship between a light-emitting section 414 and light-receiving sections 422, 425, and 426, the relationship between a light-emitting section 412 and a light-receiving section 421, and the relationship between a light-emitting section 411 and a light-receiving section 423 are basically the same as the relationship between the light-emitting section 216 and the light-receiving section 222 of FIG. 18, except that the waveguides therebetween have vertical portions.

This device is preferably fabricated as described below. First of all, the first to fifth layers 410a to 410e are formed on separate first to fifth substrates, respectively. The first substrate on which is formed the first layer 410a could act as the substrate 400 shown in FIG. 24, but otherwise the first layer 410a is peeled from the first substrate and is transferred to the substrate 400 shown in FIG. 24. Thereafter, each of the second layer 410b to the fifth layer 410e is peeled from the corresponding second to fifth substrates, then is transferred and positioned to form a stack on the substrate 400 in the sequence shown in FIG. 24. This peeling and transfer method has already been disclosed by the present inventors in Japanese Patent Application No. 8-225643, so further description thereof is omitted.

This device can achieve effects similar to those of the fourth embodiment, and can also make it possible to obtain an even higher degree of integration.

Note that the present invention is not limited the above described embodiments, and various modifications can be made within the scope of the present invention. For example, the above embodiments used organic EL and semiconductor lasers by way of example, but the present invention is not limited thereto and thus the configuration can also include inorganic EL and light-emitting diodes. In addition, the light-receiving elements are not limited to PIN photodiodes, and thus other types of diode such as PN photodiodes or avalanche photodiodes, phototransistors, or photo-luminescent components could be used therefor.

In addition, the microcomputer that is the information processing system of the present invention is not limited to having the functional units shown in FIG. 17; various other structures and types of functional unit could be provided therefor, as appropriate. In particular, if one system LSI is used as a microcomputer on a single chip, as in the fifth embodiment, some of the functional units that are necessary for a conventional microcomputer could be omitted. The functional units omitted from that chip could be incorporated into another semiconductor device that is connected by an external bus line to that chip.

Furthermore, electronic equipment incorporating the microcomputer or system LSI of the present invention could be implemented favorably as any appliance that comprises a microcomputer in the art, particularly when lower power consumptions are required, such as portable electronic equipment, information communications equipment, domestic or commercial electronic equipment, machine tools, and automobile components.

Seventh Embodiment

Figure 25:
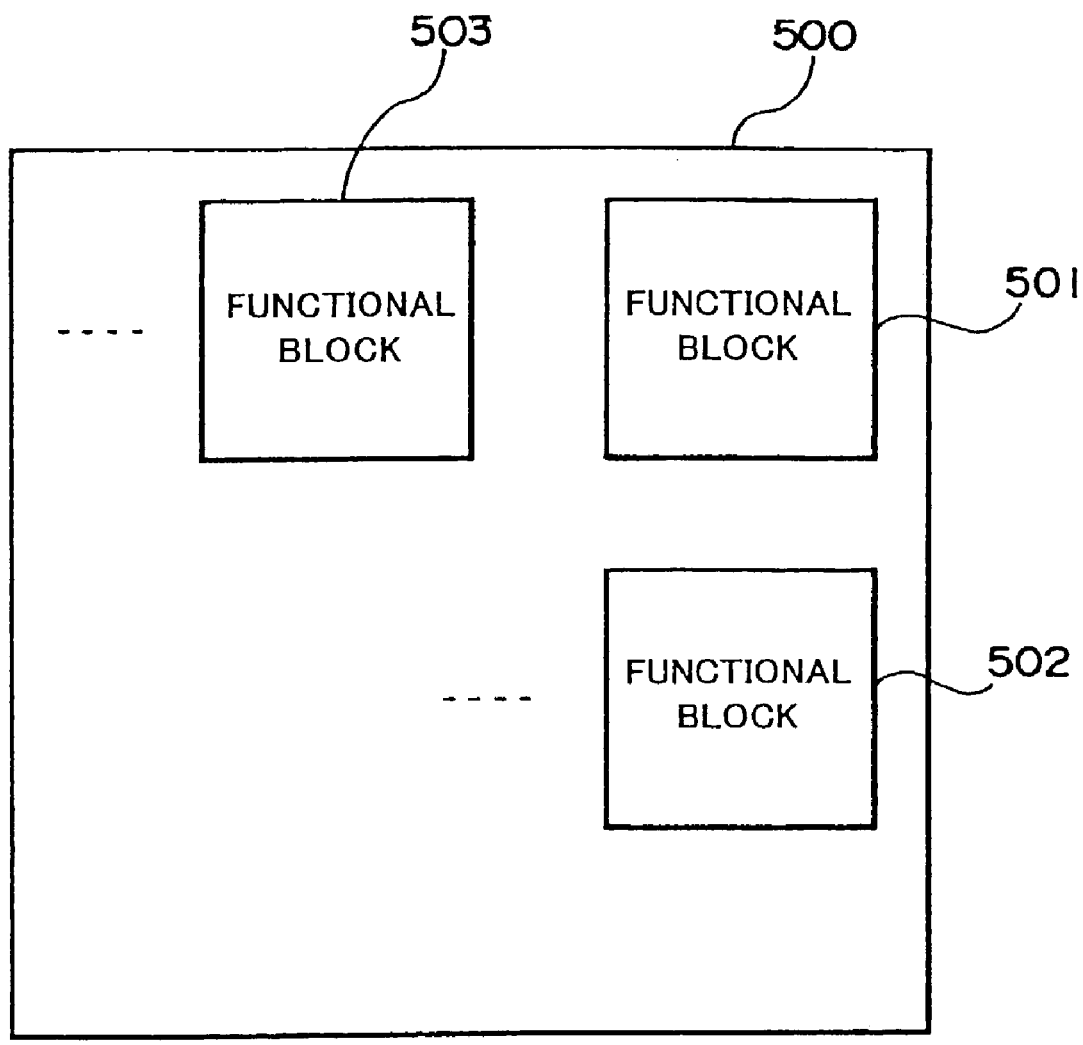
FIG. 25 is a schematic view of a system LSI in accordance with a seventh embodiment of the present invention.

The description now turns to a system LSI in accordance with a seventh embodiment of the present invention, implemented by the application of the configuration of the second or fourth embodiment, with reference to FIG. 25.

A system LSI 500 shown in FIG. 25 incorporates a plurality of functional blocks 501, 502, 503, . . . developed by different manufacturers. The designs of the three functional blocks 501, 502, and 503 shown in FIG. 25 were based on libraries developed independently by Company A, Company B, and Company C, respectively. Assume that this system LSI 500 is manufactured by Company C. Company C has received consent from Company A and Company B concerning intellectual property rights for the burning of the functional blocks 501 and 502, to manufacture this system LSI.

In this case, if Company A and Company B are to calculate the number of licenses based on the number of system LSIs manufactured by Company C, it is necessary for Company C to provide an accurate declaration concerning the number of LSIs to be manufactured, which means that the management of these licenses is complicated for all of Companies A to C.

This seventh embodiment relates to an improvement in the way in which the responsibility for license management is split between the development manufactures and the fabrication manufacturer.

For example, the decryption key (private key) of the previously described RSA method is disclosed by license to each end user of the functional block 501 that was developed by Company A. This seventh embodiment is devised in a manner to ensure that only end users having the decryption key can make use of the functional block 501, from among all the users of the system LSI 500.

The configuration and operation of the functional block 501 will now be described.

The functional block 501 has a four-arithmetical-operations function area. This four-arithmetical-operations function area first executes at least one of encryption and decryption, when the predetermined decryption key that was given to the end user is input. After this computation is established, this functional block 501 is able to perform four-arithmetical-operations other than encryption and decryption.

More specifically, the functional block 501 has the x numbers of arithmetic units 7-1 to 7-x shown in FIG. 2, which operate as four-arithmetical-operations functional units. Some of these units can also be used as the power residue arithmetic units of FIG. 5 or FIG. 13B.

To enable the general four-arithmetical-operations function of the functional block 501 in this case, the necessary condition therefor could be specified as the deciphering of the encrypted text $M^e \equiv C$ mod n of Equation 3 given in the section describing the principle of the RSA method used by the second embodiment. In such a case, the end user inputs the decryption key that was acquired beforehand by license, then uses the plurality of power residue arithmetic units within the functional block 501 to execute the computation of Equations 4 and 5 given in the section describing the principle of the RSA method used by the second embodiment, thus decrypting the encrypted text. The result of this decryption enables the general four-arithmetical-operations function using the x numbers of arithmetic units 7-1 to 7-x of FIG. 2 provided within the functional block 501, so that the functional block 501 can be used.

Note that if it is too complicated to input the decryption key every time the functional block 501 is used, a storage section could be provided for holding the decryption key acquired by license.

Thus the functional block 501 is provided with the configuration of the first embodiment shown in FIG. 2, and part thereof is used for decrypting the encrypted text as described in the second embodiment.

It should be obvious in this case that the techniques of the fourth to sixth embodiments could be used for signal transmissions between the functional blocks of the system LSI 500 and within each functional block, so that optical transmissions are used therefor.

The invention claimed is:

1. A system LSI incorporating a plurality of functional blocks developed by different manufacturers, wherein:
   at least one of said plurality of functional blocks comprises a four-arithmetical-operations function area; and
   said four-arithmetical-operations function area executes computations for decryption when a predetermined decryption key has been input thereto, and a four-arithmetical-operations function other than said decryption is enabled after said decryption is established.

2. The system LSI as defined in claim 1, wherein:
   said four-arithmetical-operations function area comprises:
   a plurality of arithmetic units, each computing to an arithmetic precision of $2^m$ bits (where m is a natural number and is fixed), based on a processing sequence; and
   a plurality of cascade connection terminals for cascading said arithmetic units,
   wherein, when the maximum arithmetic precision that is. required during computational processing is $2^n$ bits (where n is a natural number and is fixed), x numbers of said arithmetic units are cascaded (where x is a natural number and is fixed) in a manner such that the inequality $x \geq 2^n/2^m$ is satisfied.

3. The system LSI as defined in claim 2, wherein:
   when an arithmetic precision of $2^{n1}$ bits (where $n1 \leq n$, and n1 is variable) is required during computational processing, x1 numbers of said arithmetic units are cascaded in a manner such that the inequality $x1 \geq 2^{n1}/2^m$ (where x1 is a natural number and is variable) is satisfied.

4. The system LSI as defined in claim 2,
   wherein optical signals are transmitted between said plurality of arithmetic units.

5. The system LSI as defined in claim 2, wherein:
   a portion of said plurality of arithmetic units comprises a plurality of power residue arithmetic units that are cascaded;
   each of said plurality of power residue arithmetic units comprises:
   a multiplication unit for performing a multiplication at a multiplication precision of $2^m$ bits (where m is a natural number and is fixed); and
   a division unit for performing a division at a division precision of $2^{2 \times m}$ bits; and
   when the maximum arithmetic precision of a power residue computation executed by said plurality of power residue arithmetic units is $2^n$ (where n is a natural number and is fixed); x numbers of said plurality of power residue arithmetic units are connected together for decryption in a manner such that the following inequality is satisfied:

$x \geq 2^n/2^m$ (where x is a natural number and is fixed).

6. The system LSI as defined in claim 5,
   wherein, when an arithmetic precision of $2^{n1}$ bits (where $n1 \leq n$, and ni is variable) is required during computational processing, x1 numbers of said plurality of power residue arithmetic units are cascaded in a manner such that the inequality $x1 \geq 2^{n1}/2^m$ (where $x1 \leq x$ and is variable) is satisfied.

7. The system LSI as defined in claim 5,
   wherein optical signals are transmitted between said plurality of power residue arithmetic units.

8. Electronic equipment comprising a system LSI as defined in claim 1.

* * * * *